United States Patent
Sakai et al.

(10) Patent No.: US 6,287,232 B1
(45) Date of Patent: Sep. 11, 2001

(54) NON-FINITE SPEED RATIO CONTINUOUSLY VARIABLE TRANSMISSION DEVICE

(75) Inventors: Hiromasa Sakai, Yokosuka; Motoharu Nishio, Yokohama, both of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/459,922

(22) Filed: Dec. 14, 1999

(30) Foreign Application Priority Data

Dec. 15, 1998 (JP) .................................. 10-356278

(51) Int. Cl.⁷ .............................. F16H 37/14; F16H 47/02
(52) U.S. Cl. .............................................. 475/216; 475/70
(58) Field of Search ............................ 475/70, 216, 217, 475/214; 476/10, 3

(56) References Cited

U.S. PATENT DOCUMENTS

| | | | |
|---|---|---|---|
| 5,194,052 | * 3/1993 | Ueda et al. | 475/70 X |
| 5,711,741 | * 1/1998 | Inoue | 476/10 |
| 5,779,591 | * 7/1998 | Inoue | 476/10 X |
| 5,902,207 | * 5/1999 | Sugihara | 476/10 |
| 5,935,039 | * 8/1999 | Sakai et al. | 476/10 |
| 5,980,420 | * 11/1999 | Sakamoto et al. | 476/10 |
| 6,030,311 | * 2/2000 | Osumi | 476/10 X |
| 6,063,002 | * 3/2000 | Nobumoto et al. | 477/41 |

FOREIGN PATENT DOCUMENTS

| | | |
|---|---|---|
| 63-130954 | 6/1988 | (JP) . |
| 9-42428 | 2/1997 | (JP) . |
| 9-89071 | 3/1997 | (JP) . |

* cited by examiner

Primary Examiner—Charles A Marmor
Assistant Examiner—Ha Ho
(74) Attorney, Agent, or Firm—Foley & Lardner

(57) ABSTRACT

In a non-finite speed ratio transmission device using a toroidal continuously variable transmission (2), a hydraulic cylinder (30) for driving a power roller (20) via a trunnion (23), a shift control valve (46) for controlling a supply direction of oil to an oil chambers (30A, 30B) of the hydraulic cylinder (30), and a precess cam (35) which feeds back a displacement of the power roller (20) to the shift control valve (46) so as to shut-off the flow of oil to and from the oil chambers (30A, 30B), are provided. The shift control valve (46) comprises a drain port (46J) which can be connected to the oil chamber (30A) and a drain port (46I) which can be connected to the oil chamber (30B). By providing a positive torque control valve (40) which controls the oil pressure of the drain port (46I), and a negative torque control valve (45) which controls the oil pressure of the drain port (46J), the shift control valve (46) controls a differential pressure $\Delta P$ of the oil chambers (30A, 30B) from 0 to a line pressure PL when the speed ratio ic of the toroidal continuously variable transmission (2) is maintained in the vicinity of a geared neutral position GNP.

3 Claims, 20 Drawing Sheets

NON-FINITE SPEED RATIO CONTINUOUSLY VARIABLE TRANSMISSION DEVICE

FIELD OF THE INVENTION

This invention relates to a non-finite speed ratio transmission device for vehicles using a toroidal continuously variable transmission.

BACKGROUND OF THE INVENTION

A non-finite speed ratio transmission device which combines a toroidal continuously variable transmission (CVT), a fixed speed ratio transmission and a planetary gear unit for increasing the speed ratio range of the CVT is disclosed in Tokkai Hei 9-42428 published by the Japanese Patent Office in 1997.

In this device, the engine output is input to both the CVT and a fixed speed ratio transmission. The output shaft of the CVT is joined to a sun gear of the planetary gear unit and an output shaft of the fixed speed ratio transmission is joined to a carrier of planet gears of the planetary gear unit via a power circulation clutch. A ring gear of the planetary gear unit is joined to the drive shaft which drives the wheels. The output shaft of the CVT is also joined to the drive shaft via a direct clutch.

In this device, two power transmission modes are used, i.e., a direct drive mode in which a direct clutch is engaged and a power circulation clutch is disengaged, and a power circulation mode in which the direct clutch is disengaged and the power circulation clutch is engaged.

In the direct mode, the engine output is transmitted to the drive shaft via the CVT. In the power circulation mode, the rotation of the ring gear stops in a position where the rotation of the sun gear which rotates due to the output of the CVT and the rotation of the planet carrier which rotates due to the output of the fixed speed ratio transmission, are balanced. This state is the neutral state where a rotation torque is not transmitted to the drive shaft.

In this case, the ratio of the engine rotation speed and the rotation speed of the drive shaft, i.e., the speed ration of the non-finite speed ratio transmission device, becomes infinite.

This state is called the geared neutral position GNP. Therefore, the rotation direction of the ring gear changes according to whether the speed ratio of the CVT is larger or smaller than the GNP. Forward or reverse motion of the vehicle from stop is therefore performed by increasing or decreasing the speed ratio of the CVT from the GNP.

In this device the speed ratio of the CVT increases as the vehicle speed increases when the vehicle is moving forward in the power circulation mode. Herein the speed ratio of the CVT denotes the ratio of the input rotation speed and output rotation speed of the CVT. When the speed ratio of the CVT has increased to a predetermined speed ratio, the power circulation clutch is disengaged and the direct clutch is engaged.

Hence, there is a change-over from the power circulation mode to the direct mode. In the direct mode, the output of the CVT is directly transmitted to the drive shaft without modification.

Therefore, according to this transmission, all running states including forward and reverse from the stop state of the vehicle, and running at high speed, can be changed over smoothly without using a torque converter. An identical non-finite speed ratio transmission is also disclosed in U.S. Pat. No. 5,935,039.

SUMMARY OF THE INVENTION

The speed ratio of the CVT is changed by moving trunnions which support power rollers in the CVT by an oil Pressure.

A piston of a hydraulic cylinder is joined to each trunnion and the hydraulic pressure is made to act on both ends of the piston, and displacement of the trunnion is performed due to this differential pressure. The differential pressure is controlled by a pressure control valve which is feedback controlled electronically.

When the speed ratio is controlled via pressure control, there is an advantage in that the torque transmitted by the CVT is easily controlled near the geared neutral position GNP of the power circulation mode.

On the other hand, there is a problem in that the response of feedback control of the pressure control valve decreases when the temperature of the oil which transmits hydraulic pressure is low.

Moreover, if there is scatter in the characteristics of the hydraulic cylinders, it is difficult to make the speed ratio of the continuously variable transmission coincide with a target speed ratio with sufficient precision. Specifically, when an input torque of the CVT abruptly changes, a difference between a command value of the differential pressure and a real differential pressure exerted on the piston becomes large, and the precision of speed ratio control declines.

It is therefore an object of this invention to increase the control precision of speed ratio of a non-finite speed ratio transmission device while maintaining desirable transmission torque control characteristics near the geared neutral position GNP of the power circulation mode.

In order to achieve the above object, this invention provides a non-finite speed ratio transmission device for use with a vehicle, comprising a toroidal continuously variable transmission which varies a speed ratio according to a gyration angle of a power roller gripped by an input disk and output disk, a fixed speed ratio transmission which varies a rotation speed of the input disk at a fixed speed ratio, a planetary gear unit having a final output shaft which varies a rotation direction according to a relation between a rotation output speed of the toroidal continuously variable transmission and a rotation output speed of the fixed speed ratio transmission, a hydraulic cylinder comprising a first oil chamber and second oil chamber, a direction change-over valve which selectively supplies an oil pressure to the first oil chamber and the second oil chamber according to a displacement position, an actuator which displaces the direction change-over valve, a feedback member which feeds back a displacement of the power roller to the direction change-over valve, and an oil pressure control valve which varies the differential pressure between the first oil chamber and second oil chamber.

The power roller varies the gyration angle according to a displacement of a supporting member which supports the power roller, and the hydraulic cylinder displaces the supporting member according to a differential pressure between the first oil chamber and the second oil chamber. The feedback member connects the supporting member and direction change-over valve, and is arranged to displace the direction change-over valve in a direction opposite to a direction of displacement of the direction change-over valve due to the actuator.

The details as well as other features and advantages of this invention are set forth in the remainder of the specification and are shown in the accompanying drawings.

DESCRIPTION OF THE PREFERRED EMBODIMENTS

Figure 1:
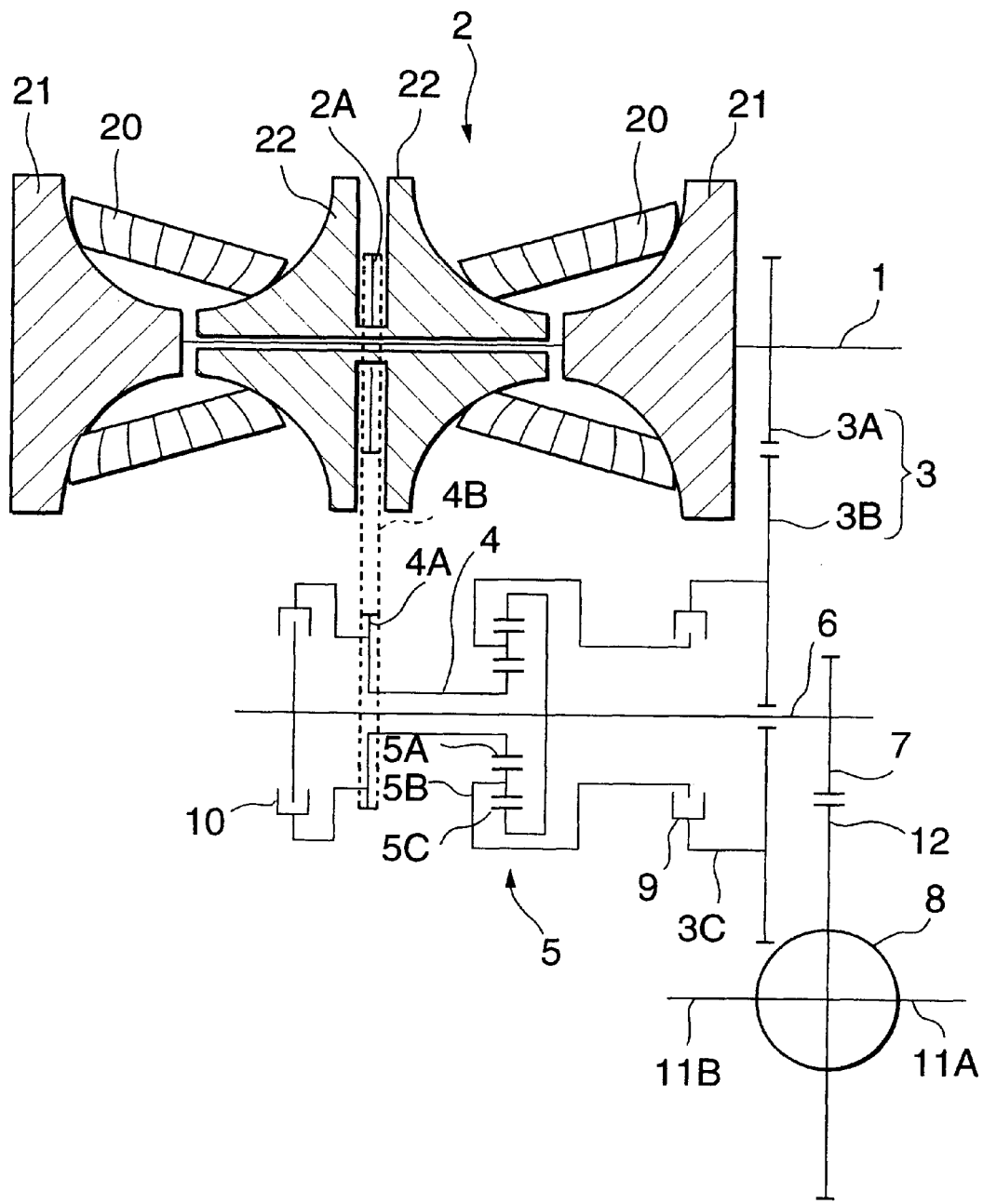
FIG. 1 is a schematic diagram of a non-finite speed ratio transmission device according to this invention.

Referring to FIG. 1 of the drawings, a non-finite speed ratio transmission device for a vehicle comprises an input shaft 1, toroidal continuously variable transmission (CVT) 2, fixed speed ratio transmission 3, planetary gear mechanism 5 and final output shaft 6.

The CVT 2 comprises two toroidal units each of which is provided with a an input disk 21 and output disk 22. The input disk 21 and output disk 22 grip a pair of power rollers 20. The input disks 21 are joined to the input shaft 1. The input shaft 1 is joined to the output shaft of an engine, not shown. The rotation of the output disk 22 is transmitted to a CVT output shaft 4 via a sprocket 2A, chain 4B and sprocket 4A.

Figure 3:
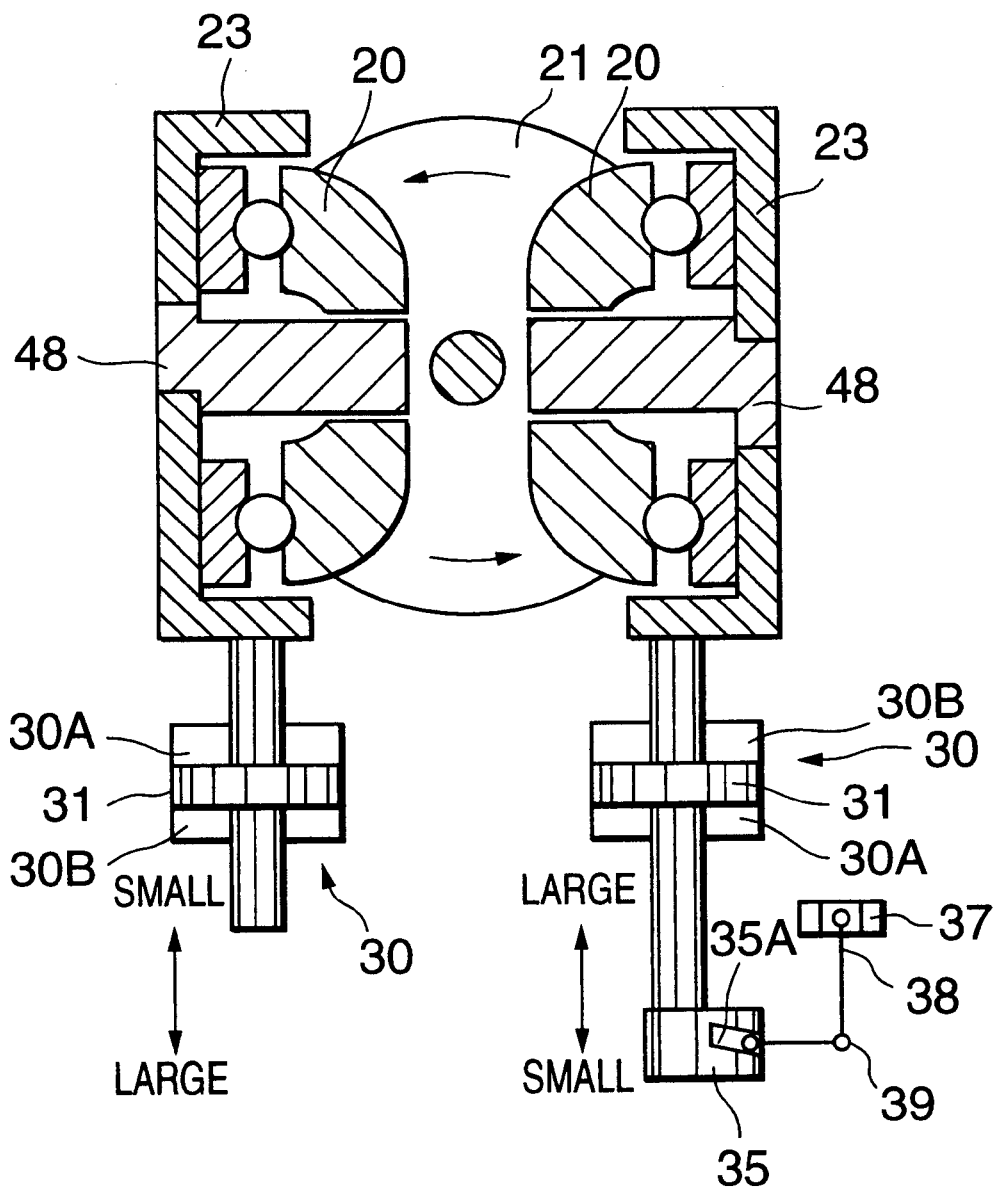
FIG. 3 is a schematic diagram of a toroidal continuously variable transmission which forms part of the non-finite speed ratio transmission device.

Referring to FIG. 3, the power roller 20 is supported by a trunnion 23 via an eccentric pivot shaft 48. The trunnion 23 is driven in the vertical direction of the figure by a hydraulic cylinder 30. The hydraulic cylinder 30 comprises a piston 31 fixed to the trunnion 23, and oil chambers 30A, 30B facing the piston 31. The trunnion 23 displaces in an axial direction according to the differential pressure of the oil chambers 30A and 30B, and varies the contact position between the power roller 20, input disk 21 and output disk 22. Consequently, the balance of force around the axis of the trunnion 23 which the disks 21, 22 exert on the power roller 20 varies, and the gyration angle of the power roller 20 varies.

Also, the trunnion 23 undergoes a rotational displacement with the displacement of the gyration direction of the power roller 20. As the gyration angle of the power roller 20 varies, the ratio of the rotation speeds of the input disk 21 and the output disk 22, i.e., the speed ratio of the CVT 2, varies continuously.

Of the pair of trunnions 23, the oil chamber 30A of one of the trunnions 23 is provided above the piston 31, and the oil chamber 30A of the other trunnion 23 is provided below the piston 31. Likewise, the oil chamber 30B of one of the trunnions 23 is provided above the piston 31, and the oil chamber 30B of the other trunnion 23 is provided below the piston 31. Equal hydraulic pressures are applied to the two oil chambers 30A, and equal hydraulic pressures are applied to the two oil chambers 30B. Due to this arrangement of the oil chambers 30A, 30B, the two sets of trunnions 23 are driven in mutually opposite directions.

Figure 4:
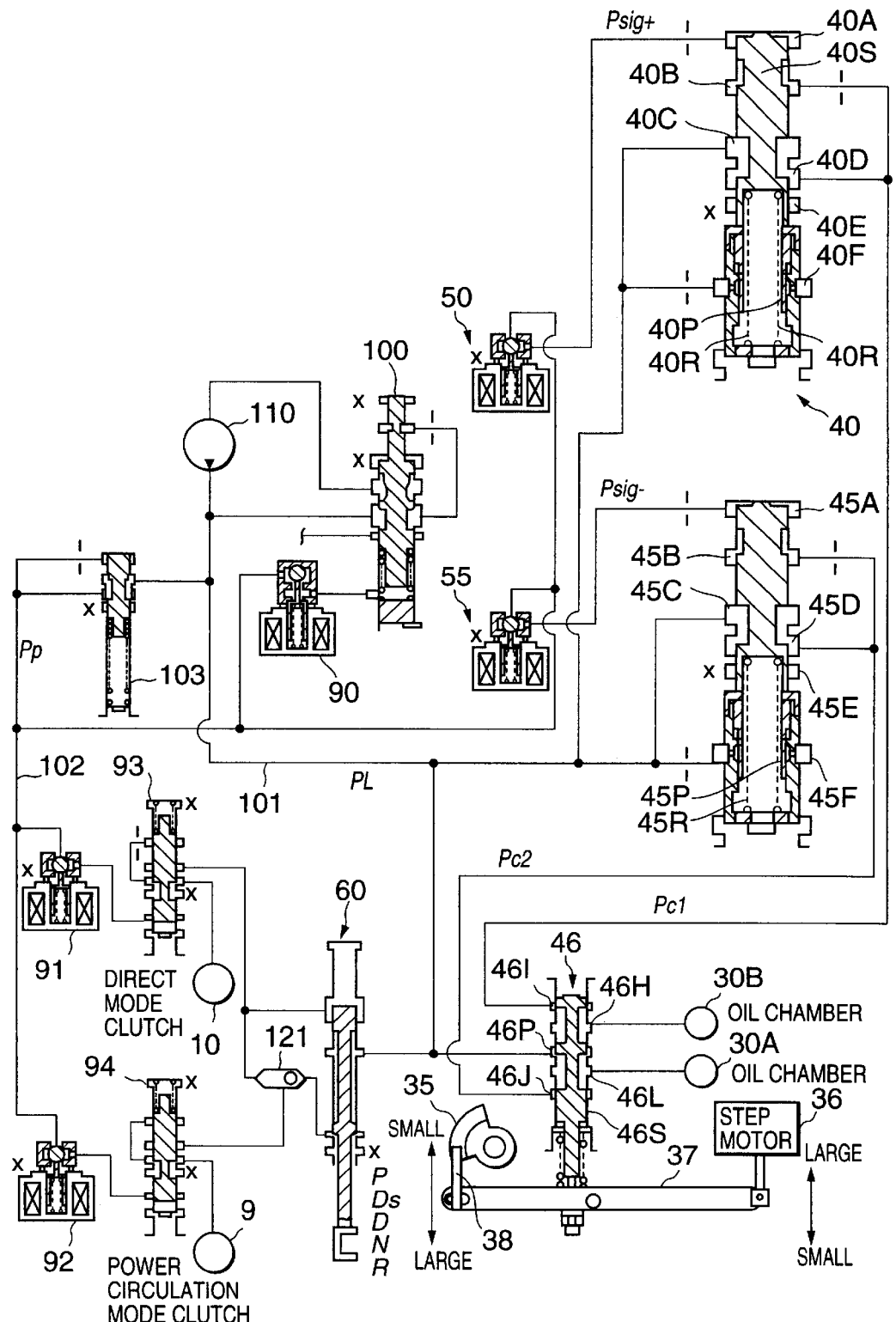
FIG. 4 is a diagram of a hydraulic pressure circuit of the non-finite speed ratio transmission device.

The CVT 2 comprises a total of four trunnions 23, but a precess cam 35 is attached to one as shown in FIGS. 3 and 4. An oil pressure is selectively applied to the oil chambers 30A, 30B from a shift control valve 46 which is a directional control valve, as shown in FIG. 4. The precess cam 35 feeds back the rotation angle of the trunnion 23, i.e., the gyration angle φ of the power roller 20, and the axial displacement of the trunnion 23, to the shift control valve 46

For this purpose, a cam groove 35A inclined in a circumferential direction is formed in the precess cam 35, as shown in FIG. 3, and an end of a L-shaped feedback link 38 engages with the cam groove 35A.

The feedback link 38 is supported free to pivot around a pivot axis 39. The other end is joined to an end of a speed change link 37.

Referring to FIG. 4, the center part of the speed change link 37 is connected with an end of a spool 46S of the shift control valve 46, and the other end of the speed change link 37 is joined to the step motor 36. Due to this arrangement, the speed change link 37 displaces the spool 46S in the axial direction according to the drive of the step motor 36.

It also displaces the spool 46S in the axial direction according to the rotational displacement and axial displacement of the precess cam 35, and as a result, the spool 46S is held in a position in which the displacements according to the step motor 36 and the precess cam 35 are balanced.

Referring again to FIG. 1, the CVT output shaft 4 is joined to a sun gear 5A of the planetary gear mechanism 5, and is also joined to the final output shaft 6 via a direct mode clutch 10.

The fixed speed ratio transmission 3 comprises a gear 3A which rotates together with the input shaft 1, a gear 3B and a gear output shaft 3C. The gear 3A is meshed with the gear 3B, and the gear 3B is joined to the gear output shaft 3C via a power circulation mode clutch 9.

The gear output shaft 3C is joined to a planet carrier 5B holding planet gears of the planetary gear unit 5.

A ring gear 5C of the planetary gear unit 5 is joined to the final output shaft 6.

The rotation of the final output shaft 6 is transmitted to the driving wheels 11A, 11B of the vehicle via a transmission output gear 7, final gear 12 and differential gear unit 8.

In this non-finite speed ratio transmission device, the drive of the drive wheels 11A, 11B is transmitted by two kinds of power transmission mode, i.e., a power circulation mode wherein the power circulation mode clutch 9 is engaged and the direct mode clutch 10 is released, or a direct mode wherein the power circulation mode clutch 9 is released and the direct mode clutch 10 is engaged.

In the power circulation mode, the rotation speed of the planet carrier 5B is equal to a value obtained by dividing the engine rotation speed by a speed ratio of the fixed speed ratio transmission 3.

The speed ratio of the reduction gear 3 is a fixed value. On the other hand, the rotation speed of the sun gear 5A is equal to a value obtained by dividing the engine rotation speed by the speed ratio ic of the continuously variable transmission 2.

It should be noted that the rotation direction of the sun gear 5A and planet carrier 5B is always fixed.

Under these conditions, the rotation direction of the ring gear 5C which is joined to the final output shaft 6 varies according to the ratio of the rotation speed of the planet carrier 5B, and the rotation speed of the sun gear 5C. In other words, it varies according to the ratio of the engine rotation speed and the rotation speed of the CVT output shaft 4, i.e., according to the speed ratio ic of the continuously variable transmission 2. The point at which the rotation direction changes corresponds to a geared neutral position GNP shown in FIG. 9.

At the geared neutral position GNP, the ring gear 5C i.e., the final output shaft 6, does not rotate, and the vehicle stops. If the speed ratio ic increases beyond the geared neutral position GNP, the ring gear 5C rotates in the forward direction, and if the speed ratio ic decreases to less than the GNP, the ring gear 5C rotates in the reverse direction. That is, in the power circulation mode, vehicle forward and reverse are changed over by controlling the speed ratio ic.

Figure 6:
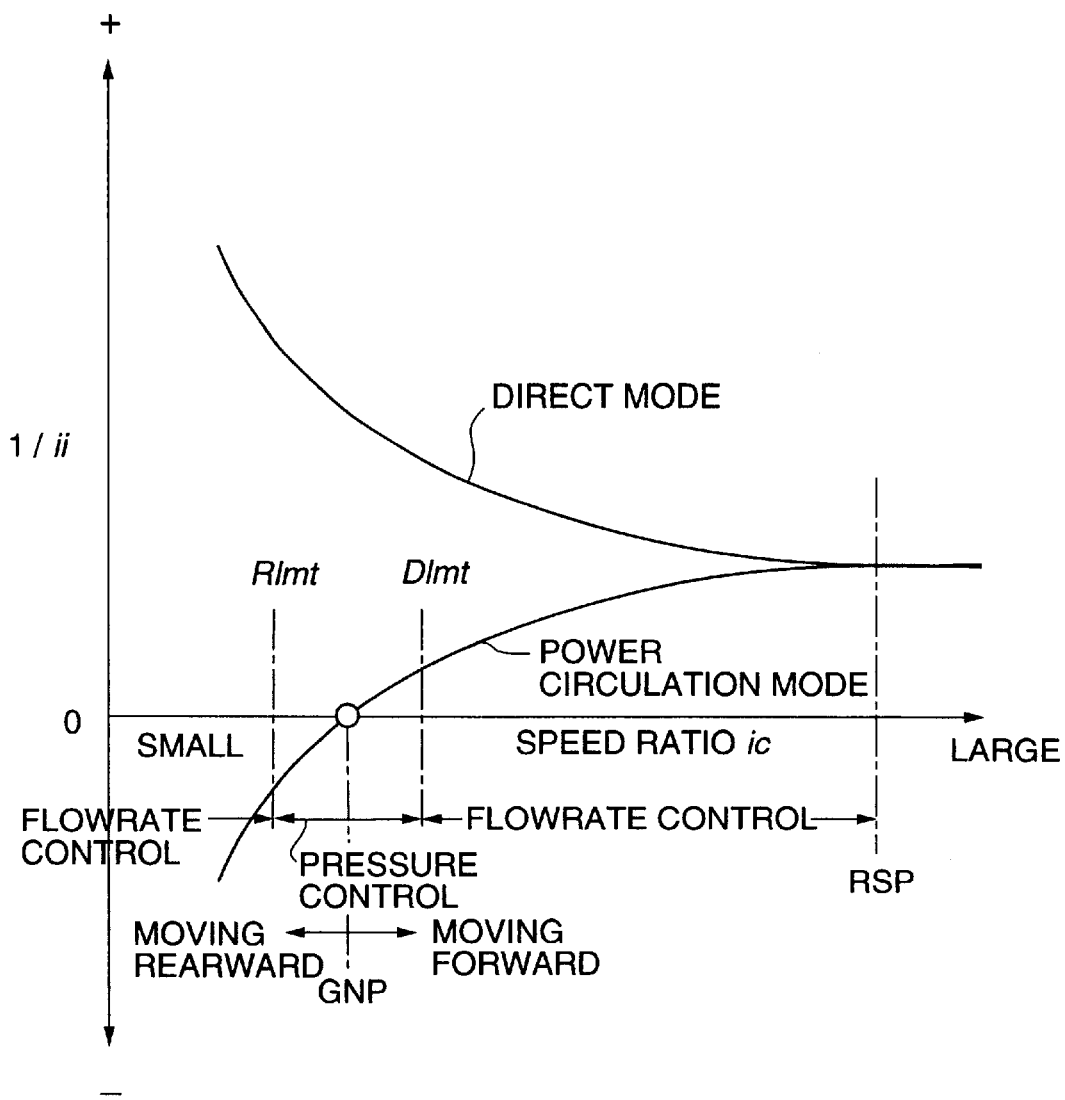
FIG. 6 is a diagram describing a relation of a speed ratio ic of the toroidal continuously variable transmission and the inverse of a speed ratio ii of the non-finite speed ratio transmission device.

When the vehicle advances in the power circulation mode, as the speed ratio ic of the continuously variable transmission 2 increases, the final speed ratio ii of the non-finite speed ratio continuously variable transmission decreases. In other words, the inverse 1/ii of the final speed ratio ii increases, as shown in FIG. 6. When the final speed ratio ii reaches a certain value, the power circulation mode shifts to the direct mode. In the direct mode, the rotation of the CVT output shaft 4 is directly transmitted to the final output shaft 6, so as the speed ratio ic of the continuously variable transmission 2 decreases, the final speed ratio ii of the non-finite speed ratio continuously variable transmission also decreases. In other words, as the speed ratio ic decreases, the inverse 1/ii increases.

Thus, the final speed ratio ii of the non-finite speed ratio continuously variable transmission is largest when the vehicle starts, and after the vehicle starts, it decreases as the vehicle speed increases. The speed ratio ic of the continuously variable transmission at this time first begins to increase up to a revolution synchronization point RSP, and after the power circulation mode changes over to the direct mode at the revolution synchronization point RSP, it begins to decrease. When the vehicle is decelerating as it runs, the speed ratio ic of the CVT 2 varies in an opposite direction to when the vehicle is accelerating. These characteristics of the non-finite speed ratio continuously variable transmission are disclosed in Tokkai Hei 9-89071 published by the Japanese Patent Office in 1997.

When the vehicle is moving forward, it corresponds to the case where a selector lever in the vehicle, not shown, selects a normal running range D or sports running range Ds. When the vehicle is moving backwards, it corresponds to the case where the selector lever selects a reverse range R.

During reverse, the speed ratio ic becomes smaller than geared neutral position GNP, and as the speed ratio ic decreases, the inverse 1/ii increases its value in the negative direction. That is, the final speed ratio ii approaches 0.

In the direct mode, the direction of torque transmission between the input disk 21 and output disk 22 of the CVT 2 is different for acceleration and for deceleration. During acceleration, engine torque is transmitted from the input disks 21 to the output disks 22 via the power controllers 20, but during deceleration, the torque of the drive wheels is transmitted from the output disks 22 to the input disks 21 via the power rollers 20. In the following description, transmission of engine torque from the input disks 21 to the output disks 22 via the power controllers 20 is referred to as positive torque transmission, and transmission of torque from the output disks 22 to the input disks 21 via the power rollers 20 is referred to as negative torque transmission.

On the other hand, in the power circulation mode, the direction of torque transmission by the power rollers 20 is different for forward and reverse motion, and it is also different for acceleration and deceleration. When the vehicle is moving forward, in the acceleration state where the engine torque is input to the non-finite speed ratio transmission, the power rollers 20 transmit torque in the negative direction, and in the deceleration state where the torque of the drive wheels is input to the non-finite speed ratio transmission, the power rollers 20 transmit torque in the positive direction. Conversely during reverse, in the acceleration state when engine torque is input to the non-finite speed ratio transmission, the power rollers 20 transmit torque in the positive direction, and in the deceleration state when the torque of the drive wheels is input to the non-finite speed ratio transmission, the power rollers 20 transmit torque in the negative direction. In other words, in the power circulation mode shown in FIG. 6, when the speed ratio ic of the CVT 2 varies in the increase direction, negative torque transmission is performed, and when the speed ratio ic of the CVT 2 varies in the decrease direction, positive torque transmission is performed.

The control of the non-finite speed ratio transmission device is performed via an oil pressure circuit shown in FIG. 4 based on the output signal of a speed ratio controller 80.

Next, the oil pressure circuit will be described referring to FIG. 4.

The discharge pressure of an oil pump 110 is adjusted to a predetermined line pressure PL by a pressure regulator valve 100 which is controlled via a solenoid valve 90, and the line pressure PL is supplied to a line pressure circuit 101.

The solenoid valve 90 generates a signal pressure from a pilot pressure Pp of a pilot pressure circuit 102 and outputs the signal pressure to the pressure regulator valve 100. A solenoid valve 91 which engages and disengages the direct mode clutch 10, and a solenoid valve 92 which engages and disengages the power circulation mode clutch 9, are connected to the line pressure circuit 101.

The solenoid valve 91 generates a signal pressure by processing the pilot pressure Pp of the pilot pressure circuit 102 according to a signal from the speed ratio controller 80, and supplies it to a control valve 93. The control valve 93 supplies the line pressure PL applied via a manual valve 60 to the direct mode clutch 10 according to the increase of signal pressure, and thereby engages the direct mode clutch 10. On the other hand, the control valve 93, when the signal pressure from the solenoid valve 91 decreases, disengages the direct mode clutch 10 by releasing the line pressure PL in the direct mode clutch 10 to a drain.

Likewise, the solenoid valve 92 generates a signal pressure by processing the pilot pressure Pp of the pilot pressure circuit 102 according to a signal from the speed ratio controller 80, and supplies it to a control valve 94.

The control valve 94 supplies the line pressure PL applied via the manual valve 60 and a shuttle valve 121, to the power circulation mode clutch 9 according to the increase of signal pressure, and thereby engages the power circulation mode clutch 9. On the other hand, when the signal pressure from the solenoid valve 92 decreases, the control valve 94 disengages the power circulation mode clutch 9 by releasing the line pressure PL in the power circulation mode clutch 9 to the drain.

When the speed ratio controller 80 outputs an engaging signal to either of the solenoid valves 91 and 92, it always outputs a release signal to the other solenoid valve. Due to this signal arrangement, either the power circulation mode clutch 9 or the direct mode clutch 10 is engaged while the other clutch is disengaged That is, the power circulation mode and direct mode are changed over. These mode change-covers are performed when the speed ratio ic of the CVT 2 reaches the revolution synchronization point RSP, as shown in FIG. 6.

The above-mentioned shift control valve 46, a positive torque control valve 40 and a negative torque control valve 45 are connected to the line pressure circuit 101 to control the speed ratio and transmission torque of the CVT 2 by controlling the oil supply to the two oil chambers 30A, 30B of the hydraulic cylinders 30.

The positive torque control valve 40 and negative torque control valve 45 comprise oil pressure control valves. The positive torque control valve 40 may be denoted as a first oil control valve, and the negative torque control valve 45 may be denoted as a second oil control valve. Further, the oil chambers 30B may be denoted as first oil chambers, and the chambers 30A may be denoted as second oil chambers.

An oil pressure port 46P connected to the line pressure circuit 101, a first port 46H connected to the oil chambers 30B of the cylinder 30, a second port 46L connected to the oil chambers 30A of the hydraulic cylinders 30, a drain port 46I connected to the positive torque control valve 40 and a drain port 46J connected to the negative torque control valve 45, are formed in the shift control valve 46. The oil chambers 30A are connected to either the drain port 46J or pressure port 46P according to the displacement of the spool 46S connected to the speed change link 37. When the oil chambers 30A are connected to the drain port 46J due to the displacement of the spool 46S, the oil chambers 30B are connected to the pressure port 46P.

An oil pressure port 46P connected to the line pressure circuit 101, a first port 46H connected to the oil chambers 30B of the cylinder 30, a second port 46L connected to the oil chambers 30A of the hydraulic cylinders 30, a drain port 46I connected to the positive torque control valve 40 and a drain port 46J connected to the negative torque control valve 45, are formed in the shift control valve 46. The oil control chambers 30A are connected to either the drain port 46J or pressure port 46P according to the displacement of the spools 46S connected to the speed change link 37. When the oil chambers 30A are connected to the drain port 46J due to the displacement of the spool 46S, the oil chambers 30B are connected to the pressure port 46P.

The positive torque control valve 40 reduces the line pressure PL of the line pressure circuit 101 according to a signal pressure Psig+ of a positive torque solenoid valve 50 controlled by the speed ratio controller 80, and supplies it to the drain port 46I as a control pressure Pc1. The negative torque control valve 45 reduces the line pressure PL according to a signal pressure Psig of a negative torque solenoid valve 55 controlled by the speed ratio controller 80, and supplies it to the drain port 46J as a control pressure Pc2. Both the positive torque solenoid valve 50 and the negative torque solenoid valve 55 are valves which are normally closed such that the signal pressures Psig+ and Psig are 0 when they are not excited and increase the signal pressures Psig+ and Psig when they are excited.

The positive torque control valve 40 comprises a spool 40S, a signal pressure port 40A facing the spool 40S, an output port 40D which outputs the control pressure Pc1, a feedback port 40B connected to the output port 40D, a pressure port 40C and a drain port 40E. The signal pressure Psig+ of the positive torque solenoid valve 50 is input to the signal pressure port 40A.

The lower end of the spool 40S is pushed upwards by a spring 40R. The positive torque control valve 40 further comprises a sleeve 40P in contact with the lower end of the spool 40S, and a port 40F facing the sleeve 40P. The line pressure PL is led to the port 40F. In FIG. 4, the spool 40S is maintained in a position at which the downward force due to the signal pressure Psig+ of the signal pressure port 40A and control pressure Pc1 led to the feedback port 40B, balances the upward force due to the spring 40R and line pressure PL of the port 40F. When the signal pressure PsIg+ is equal to or less than a predetermined value, the pressure port 40C is connected to the drain port 46I of the shift control valve 46 via the output port 40D. When the signal pressure Psig+ increases, the spool 40S displaces downwards against the force of the spring 40R, and the output port 40D is connected to the drain port 40E.

The pressure-receiving surface area of the control pressure Pc1 acting on the spool 40S via the feedback port 40B is set to a value As equal to the pressure-receiving surface area of the line pressure PL acting on the sleeve 40P via the port 40F, and the spool 40S is pushed upwards according to the differential pressure of the line pressure PL and control pressure Pc1.

If the pressure-receiving surface area of the signal pressure Psig+ of the port 40A of the spool 40S is Asol, and the resilient force of the spring 40R is Fs, the balance of forces acting on the spool 40S may be expressed by the following equation:

$$(Psig+) \cdot Asol = (PL - Pc1) \cdot As + Fs \quad (1)$$

Herein, if a=Asol/As (constant) and b=Fs/As (constant), equation (1) can be rewritten as the following equation (2).

$$PL - Pc1 = a \cdot (Psig+) - b \quad (2)$$

Figure 5:
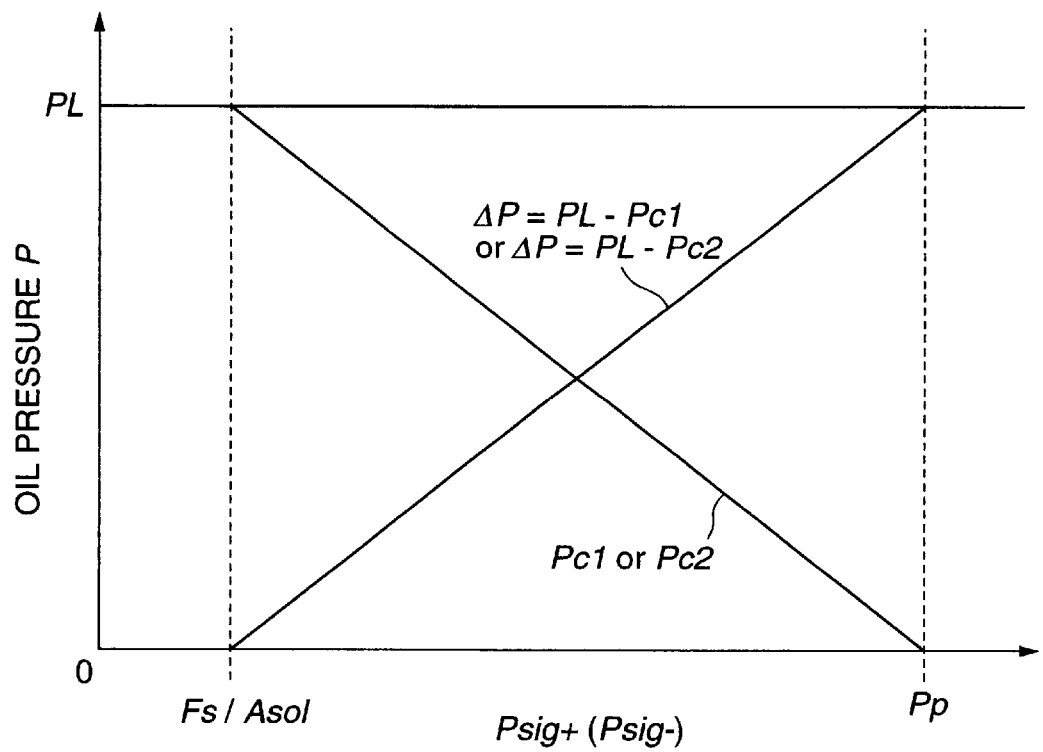
FIG. 5 is a diagram describing a relation of a signal pressure Psig+, control pressure Pc1 and line pressure PL according to this invention.

Equation (2) is graphically shown in FIG. 5. Equation (2) shows that the differential pressure $\Delta P = PL - Pc1$ can be controlled by the signal pressure Psig+.

When the signal pressure Psig+ is 0, $\Delta P = PL - Pc1 < 0$, but as the control pressure Pc1 was obtained by decreasing the line pressure PL, it does not become greater than the line pressure PL. Therefore, the spool 40S is pushed up by the resilient force Fs of the spring 40R, the pressure port 40C and output port 40D are connected, and Pc1=PL.

Due to the resilient force Fs of this spring 40R, in the interval from when the signal pressure Psig+=0 to when Psig+=b/a=Fs/Asol, the control pressure Pc1 does not depend on the signal pressure Psig+ and does not vary. This region is a dead zone of the positive torque control valve 40.

When the signal pressure Psig+ goes beyond this region, the differential pressure $\Delta P$ increases according to the signal pressure Psig+. Further, when the signal pressure Psig+ reaches the pilot pressure Pp which is the maximum value, the pressure port 40C is closed by the spool 40S and the output port 40D is connected to the drain port 40E, so the control pressure Pc1 becomes 0, and the differential pressure $\Delta P$ becomes equal to the line pressure PL.

When the line pressure PL varies, the control pressure Pc1 also varies, so this characteristic is also true when the line pressure PL varies. However, as there is a limitation 0<Pc1<PL, the range of differential pressure $\Delta P$ becomes smaller the smaller the line pressure PL. Thus, the positive torque control valve 40 controls the differential pressure $\Delta P$ including the case $\Delta P = 0$, and makes the control valve Pc1 equal to the line pressure PL when the positive torque solenoid valve 50 is not excited.

The negative torque control valve 45 comprises ports 45A–45F, spool 45S and spring 45R similar to those in the positive torque control valve 40.

The control pressure Pc2 of the output port 45D has the same characteristics as those of the control pressure Pc1 in its relation to the line pressure PL, as shown in FIG. 5.

Therefore, when the line pressure PL is supplied to the oil chambers 30A, the shift control valve 46 simultaneously applies the control pressure Pc1 to the oil chambers 30B, and when the line pressure PL is applied to the oil chambers 30B, it simultaneously applies the control pressure Pc2 to the oil chambers 30A according to the displacement of the spool 46S.

Therefore, the differential pressure $\Delta P = PL - Pc1$ or differential pressure $\Delta P = PL - Pc2$ always acts on the piston 31.

Figure 2:
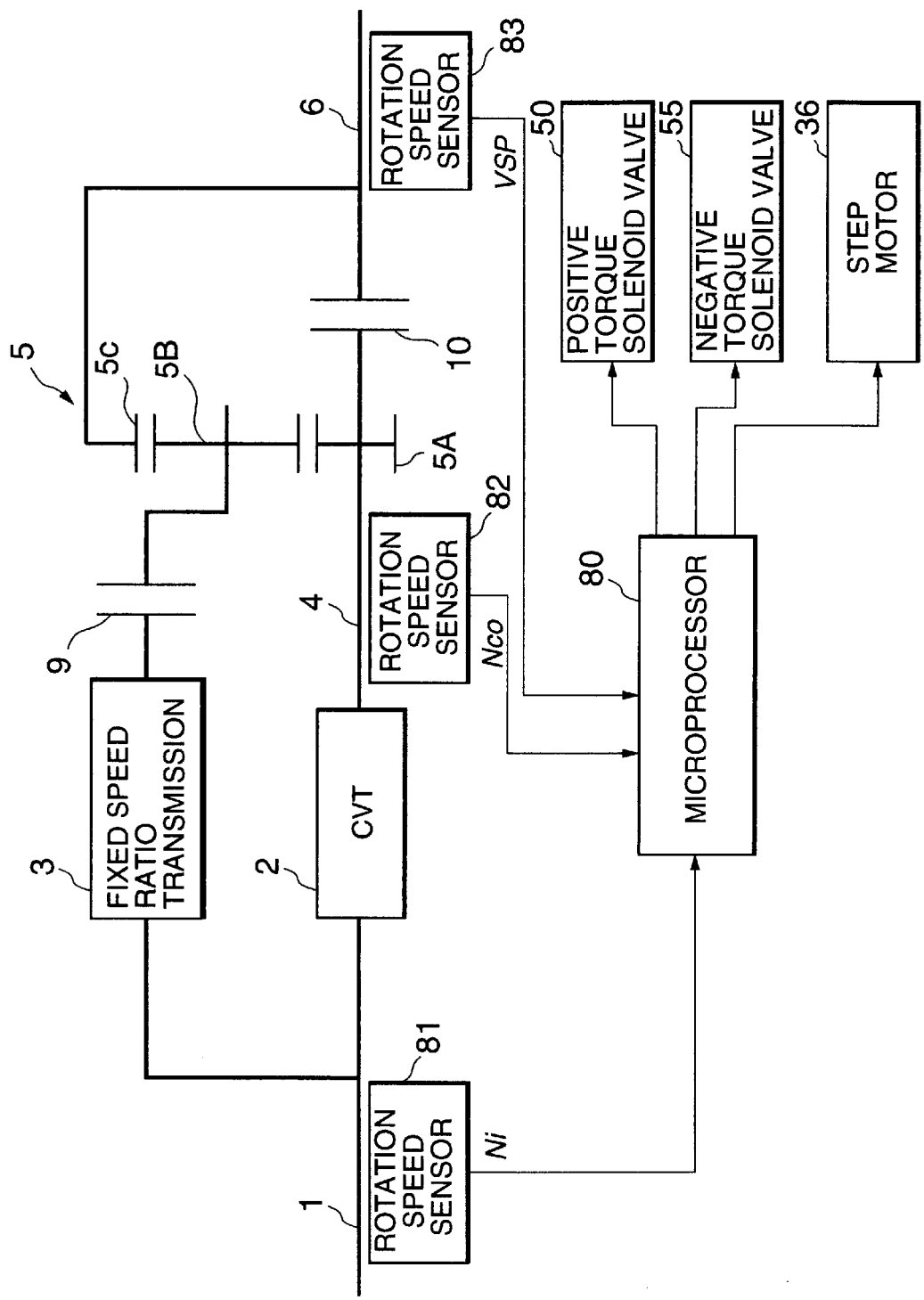
FIG. 2 is a schematic diagram of a control circuit of the non-finite speed ratio transmission device.

Next, the speed ratio controller 80 will be described referring to FIG. 2.

The speed ratio controller 80 comprises a microcomputer comprising a central processing unit (CPU), read-only memory (ROM), random access memory (ROM), and input/output interface (I/O interface). Signals are input to the speed ratio controller 80 from an input shaft rotation speed sensor 81 which detects a rotation speed Ni of the input shaft 1, CVT output shaft rotation speed sensor 82 which detects a rotation speed Nco of the CVT output shaft 4, and a vehicle speed sensor 83 which detects a vehicle speed VSP from the rotation speed of the final output shaft 6. The rotation speed Ni of the input shaft 1 is equal to the rotation speed Ne of the engine.

In addition, signals are input to the speed ratio controller 80 indicating the shift position of a selector lever attached to the transmission device from an inhibitor switch, not shown, and a depression amount of an accelerator pedal of the vehicle.

Based on these input signals, the speed ratio controller 80 outputs a signal to the solenoid valves 91 and 92, and performs change-over between the power circulation mode and direct mode.

Moreover, the final speed ratio ii of the non-finite speed ratio continuously variable transmission is controlled to a target value based on the running state of the vehicle.

In speed ratio control, further, the speed ratio control method is changed over between a specific region of the power circulation mode and another region. Here, the specific region means a region where the speed ratio ic of the CVT 2 is between R/mt and D/mt in FIG. 6. In other regions, i.e., when the speed ratio ic of the CVT 2 is larger than D/mt or when it is smaller than R1mt, the output port 40D of the positive torque control valve 40 is connected to the drain port 40E by increasing the signal pressure Psig+ output by the positive torque solenoid 50, and the control pressure Pc1 of the positive torque control valve 40 is maintained at 0. Likewise, the output port 45D of the negative torque control valve 45 is connected to the drain port 45D by increasing the signal pressure Psig– output by the negative torque solenoid 55, and the control pressure Pc2 of the negative torque control valve 45 is maintained at 0.

At the same time, by outputting a step number STEP to the step motor 36, the speed ratio controller 80 changes the position of the spool 46S of the shift control valve 46, therefore a differential pressure is set up between the oil chambers 30A and 30B, and the power rollers 20 drive the trunnions 23 so that the target speed ratio ic is realized. When both the control pressures Pc1 and Pc2 are 0, the differential pressure of the oil chambers 30A and 30B is equal to the line pressure PL.

This differential pressure changes the axial position and gyration angle $\phi$ of the power rollers 20 via the trunnions 23.

This variation is fed back to the spool 46S via mechanical feedback members comprising the precess cam 35, feedback link 38 and speed change link 37, and the spool 46S is returned to the center position and flow of oil to the oil chambers 30A, 30B is shut off when the gyration angle $\phi$ corresponding to the target speed ratio is obtained.

In this control, the differential pressure of the oil chambers 30A, 30B is always equal to the line pressure PL, and after the shift control valve 46S starts to displace due to the step motor 36, the differential pressure of the oil chambers 30A, 30B is maintained until it is returned to the center position by the mechanical feedback members. That is, the speed ratio controller 80 controls the supply direction and supply amount of oil to the oil chambers 30A, 30B via the shift control valve 46.

In the above description, this control method is referred to simply as flowrate control.

On the other hand, when the speed ratio ic of the CVT 2 is within the range between Rlmt and Dlmt, the speed ratio controller 80 controls the differential pressure $\Delta P$ of the oil chambers 30A, 30B by varying the control pressure Pc1 of the drain port 46I or the control pressure Pc2 of the drain port 46J of the shift control valve 46. In the above description, this control method is referred to as pressure control.

Now, referring to FIG. 7, a case will be described where the speed ratio ic of the CVT 2 varies within a non-specific region.

Figure 7:
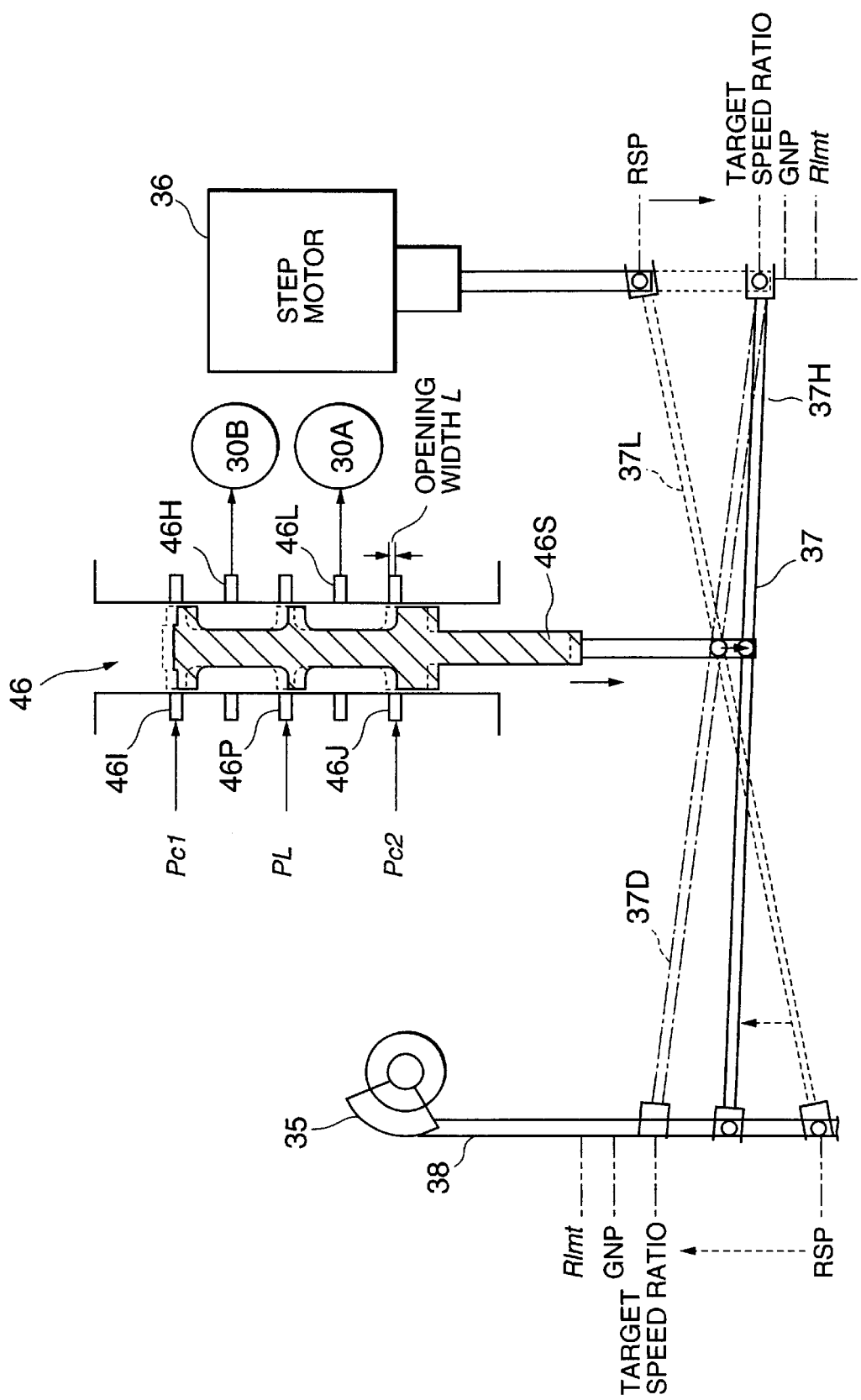
FIG. 7 is a schematic diagram of a shift control valve according to this invention.

In the power circulation mode, the position of the speed change link 37 when the speed ratio ic is held at the revolution synchronization point RSP is represented by a position 37L in FIG. 7. In this state, the signal pressures Psig+ and Psig− of the positive torque solenoid valve 50 and the negative torque solenoid valve 55 are held at the pilot pressure Pp which is a maximum value, and the pressures Pc1, Pc2 of the ports 46I, 46J are equal to 0, i.e., the drain pressure.

In this state, when the speed ratio controller 80 sets a target speed ratio smaller than RSP and larger than Daunt, a step number corresponding to the target speed ratio is input to the step motor 36. The speed ratio ic of the CVT 2 is made to vary in the decreasing direction in this way in the power circulation mode when the vehicle is moving forward and decelerating. In this case, the power rollers 20 transmit a torque in the positive direction from the input disk 21 to the output disk 22. Together with this torque transmission, the input disk 21 exerts an upward force F shown in FIG. 20 on the right-hand power roller 20 in FIG. 3.

On the other hand, the output disk 22 to which torque is transmitted from the power roller 20 exerts an upward reaction force F on the power roller in the reverse direction. Therefore, the resultant of these forces, 2F, acts on the trunnion 23.

Now, one end of the speed change link 37 displaces to a position corresponding to the target speed ratio in FIG. 7 according to the step number input to the step motor 36, and the spool 46S displaces downward in the figure. As a result, the shift control valve 46 supplies a line pressure PL to the oil chambers 30B, and the oil chambers 30A are connected to the port 46J at pressure 0. In the non-specific region up to the target speed ratio, the differential pressure ΔP of the oil chambers 30B and oil chambers 30A is equal to PL, and due to this differential pressure ΔP, the trunnion 23 on the right-hand side of FIG. 3 overcomes the resultant force 2F and displaces downwards.

The trunnion 23 on the left-hand side of the figure displaces upwards in a similar fashion. Due to these displacements, the axial positions and rotation positions of the power rollers 20 are made to vary in the decrease direction of the speed ratio ic together with the trunnion 23. Also, these positional changes are transmitted to the speed change link 37 from the precess cam 35 attached to the trunnion 23 on the right-hand side of the figure, and the other end of the speed change link 37 displaces towards a position corresponding to the target speed ratio, as shown by the solid line in FIG. 7. When the speed change link 37 reaches the center position 37D shown by the dot and dash line in the figure, the spool 46S returns to the center position, and flow of oil to or from the oil chambers 30A, 30B is shut off.

Thus, the speed ratio ic can stably and surely be fed back to the target speed ratio by feeding back the real speed ratio to the displacement of the spool 46S using these mechanical feedback members. Moreover, the displacement of the power roller 20 to gyration angles exceeding those corresponding to the minimum speed ratio or maximum speed ratio due to external disturbances can also be prevented by the mechanical feedback members.

However, when the transient target speed ratio is set to a value in the specific region between R/mt and D/mt, the speed ratio controller 80 performs the following control.

Specifically, the above-mentioned flow control is performed until the speed ratio ic of the ClVT 2 reaches R/mt, and pressure control is performed in a specific region after R/mt up to the target speed ratio. In pressure control, the step number of the step motor 36 is fixed to a value corresponding to R/mt when decreasing the speed ratio ic and to a value corresponding to D/mt when increasing the speed ratio ic, so that the shift control valve 46 does not close during pressure control.

In the specific region, the speed ratio controller 80 controls the differential pressure ΔP of the oil chambers 30A and oil chambers 30B which exerts an oil pressure on the pistons 31 by varying the pressure Pc1 of the port 46I or the pressure Pc2 of the port 46J of the shift control valve 46 according to the direction of variation of the speed ratio ic.

When the signal pressure Psig− is decreased, the control pressure Pc2 of the negative torque control valve 45 increases as shown in FIG. 5. The differential pressure ΔP of the oil chambers 30A and oil chambers 30B in this case is ΔP=PL−Pc2, and is smaller than the differential pressure ΔP=PL when the same operations are performed in the non-specific region. Thus, making the differential pressure ΔP small, a finer speed ratio control can be performed than in the case where the speed ratio ic is controlled by flowrate control by the mechanical feedback members.

Next, tolerance against errors during the above changeover of control methods will be described.

A case will be considered where the step motor 36 is in the position of the solid line in FIG. 7, and the speed change link 37 is displacing from the maximum speed ratio, i.e., the point RSP, to the target speed ratio due to mechanical feedback. The speed change link 37 stops in the position shown by the solid line in the figure as a result of errors in the mechanical feedback members. When a new target speed ratio in the specific region below D/mt is given in this state, the speed ratio controller 80 will start pressure control.

The state of the spool 46S of the shift control valve 46 at this point is shown by the solid line of FIG. 7. That is, the spool 46S connects the port 46J and oil chambers 30A by an opening of width L. In the flowrate control which was performed previously, the line pressure PL was supplied to the port 46P and the port 46J was released to the drain, but in pressure control, the line pressure PL is supplied to the port 46P while the control pressure Pc2 is supplied to the port 46J. That is, after pressure control begins, the pressure of the oil chambers 30A varies from 0 to the control pressure Pc2.

Figure 8:
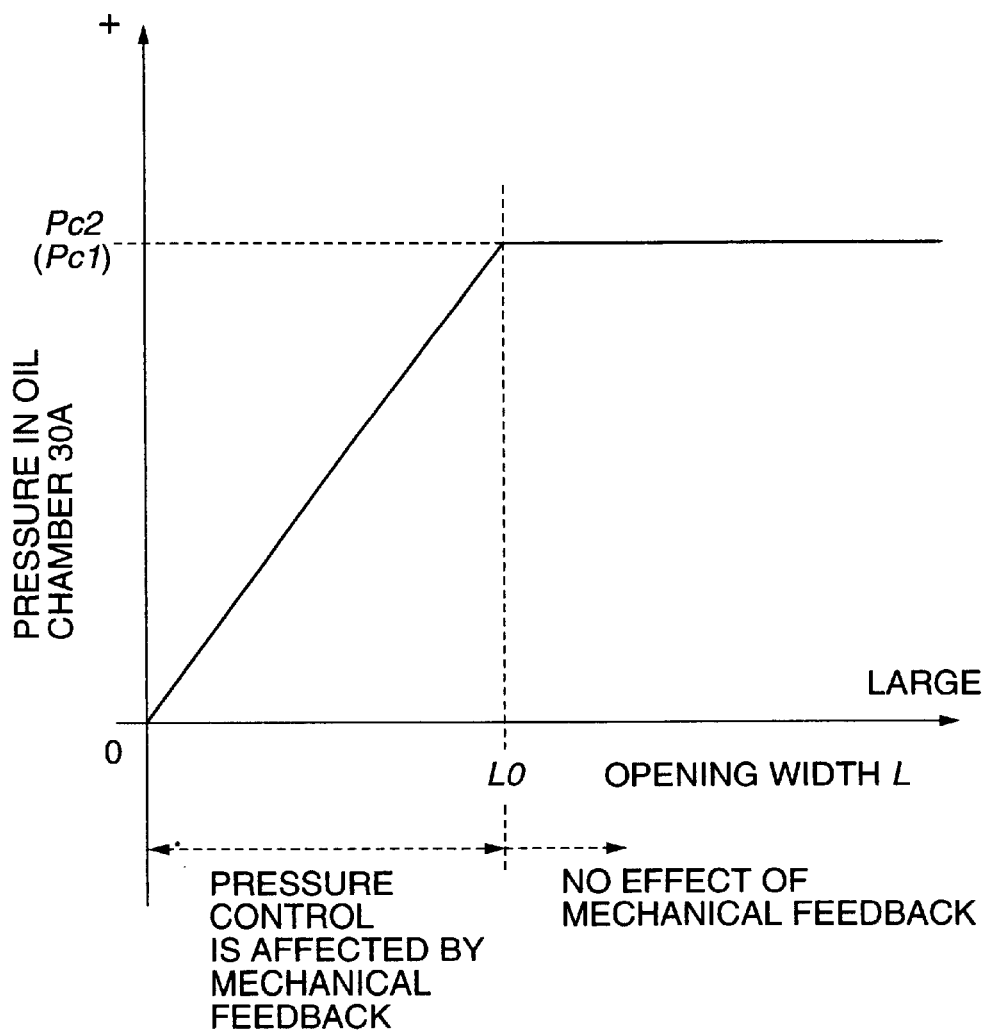
FIG. 8 is a diagram showing a relation of an opening width of a second drain port of the shift control valve, and a differential pressure $\Delta P$.

The relation of the width L of the opening of the port 46J and the pressure of the oil chambers 30A is shown in the diagram of FIG. 8. As is clear from this diagram, if the width L of the opening of the port 46J is larger than a small fixed value L0, the pressure of the oil chambers 30A is equal to the pressure Pc2 of the port 46J. Therefore, in this state, even if the position of the mechanical feedback members have shifted somewhat, it does not affect the pressure of the oil chambers 30A under pressure control.

Figure 9:
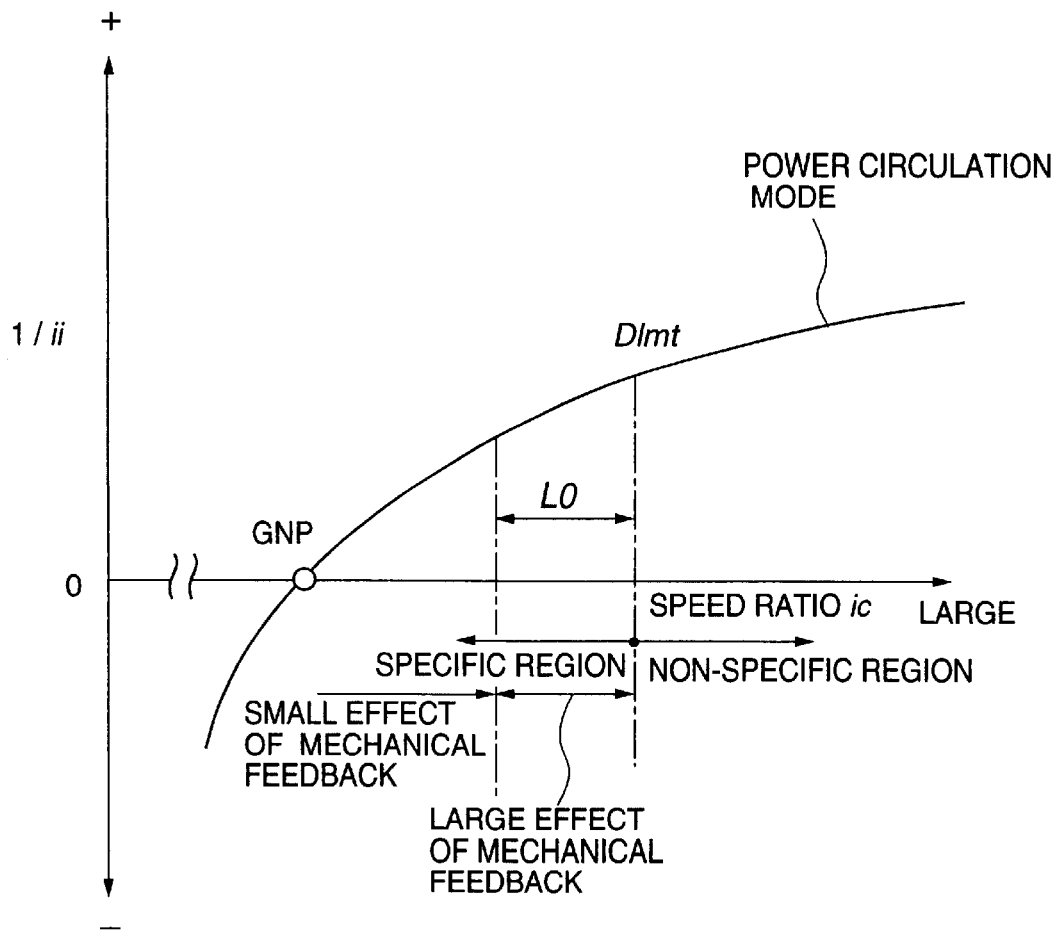
FIG. 9 is a diagram describing a relation of the speed ratio ic of the toroidal continuously variable transmission in the power circulation mode and the inverse of the speed ratio ii of the non-finite speed ratio transmission device for the purpose of describing a change-over between differential pressure control and directional flowrate control.
Figure 10:
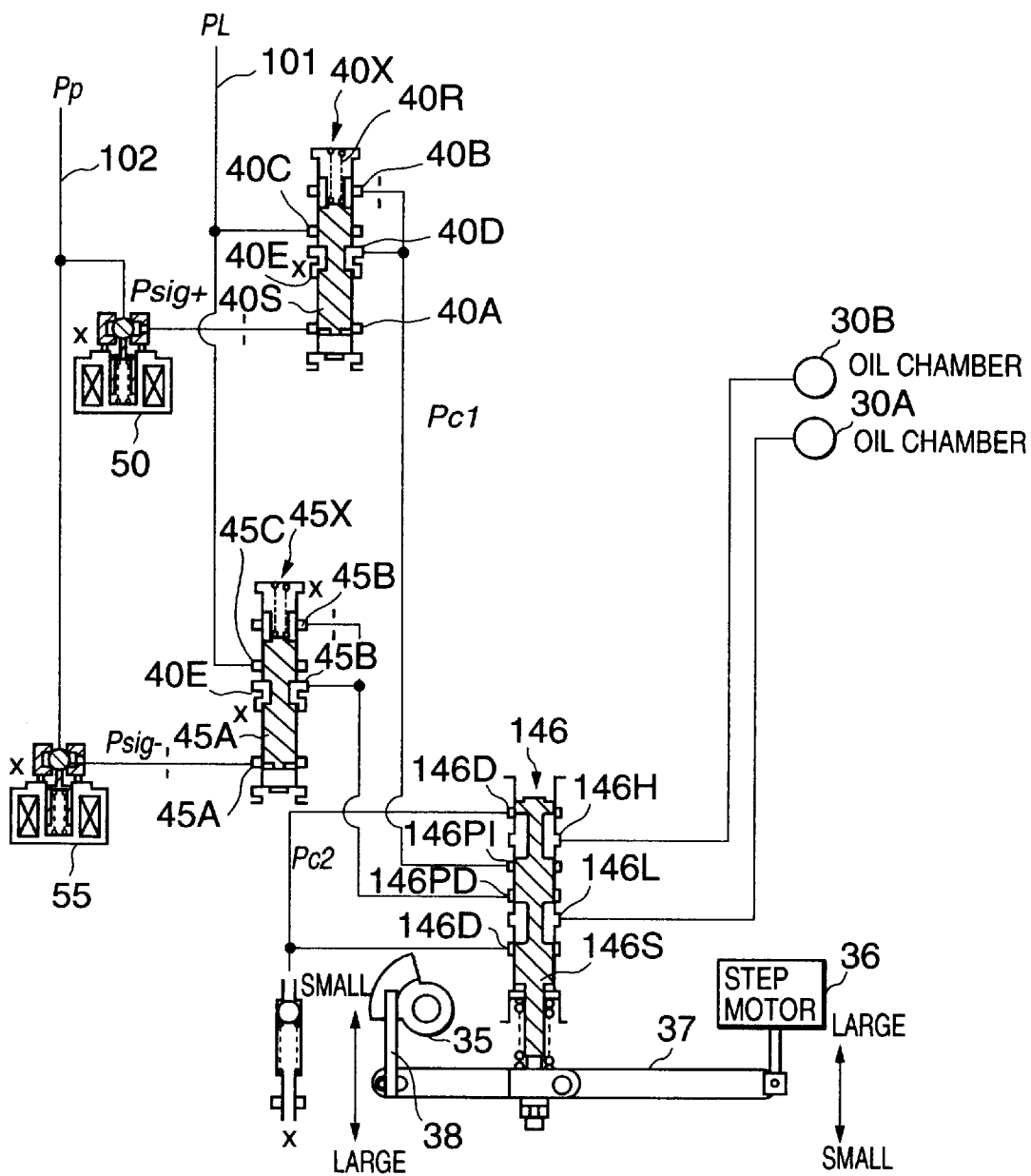
FIG. 10 is a diagram of the hydraulic pressure circuit of a non-finite speed ratio transmission device according to a second embodiment of this invention.

In the specific region, flowrate control is still performed via the mechanical feedback members towards D/mt or R/mt. When for example the speed ratio ic is increasing in the specific region, in the area where the speed ratio ic is near D/mt, the effect of flowrate control in control of the speed ratio ic via the mechanical feedback members is high as shown in FIG. 9, because the feedback members tend to close the first and second ports 46H and 46L.

On the other hand, in the area where the speed ratio ic is near the geared neutral position GNP, the action of the mechanical feedback members hardly has any effect on pressure control of the speed ratio control ic.

Now, if the control pressure Pc2 of the port 46J is made equal to the line pressure PL when the vehicle is accelerating, the differential pressure ΔP is 0, the speed ratio ic finally reaches the geared neutral position GNP, and the vehicle will stop.

In this case, although the differential pressure ΔP is 0, the oil chambers 30A and 30B face the piston 31 and exert a line pressure PL, so even if the bulk modulus varies due to mixing of air with oil etc., fluctuation of the differential pressure ΔP is prevented and the vehicle is held in a stable stop state.

When the vehicle has stopped, the torque which the power rollers transmit between the input disks 21 21 and output disks 22 is 0. In the vicinity of the geared neutral position GNP, it is possible to control this torque transmitted by the power roller 20 by the differential pressure ΔP. This torque control is used to generate a creep torque required for smooth startup of the vehicle. Creep torque is a torque which causes the vehicle to move forward or backward when the accelerator pedal is not depressed.

Next, this torque control will be described.

Figure 20:
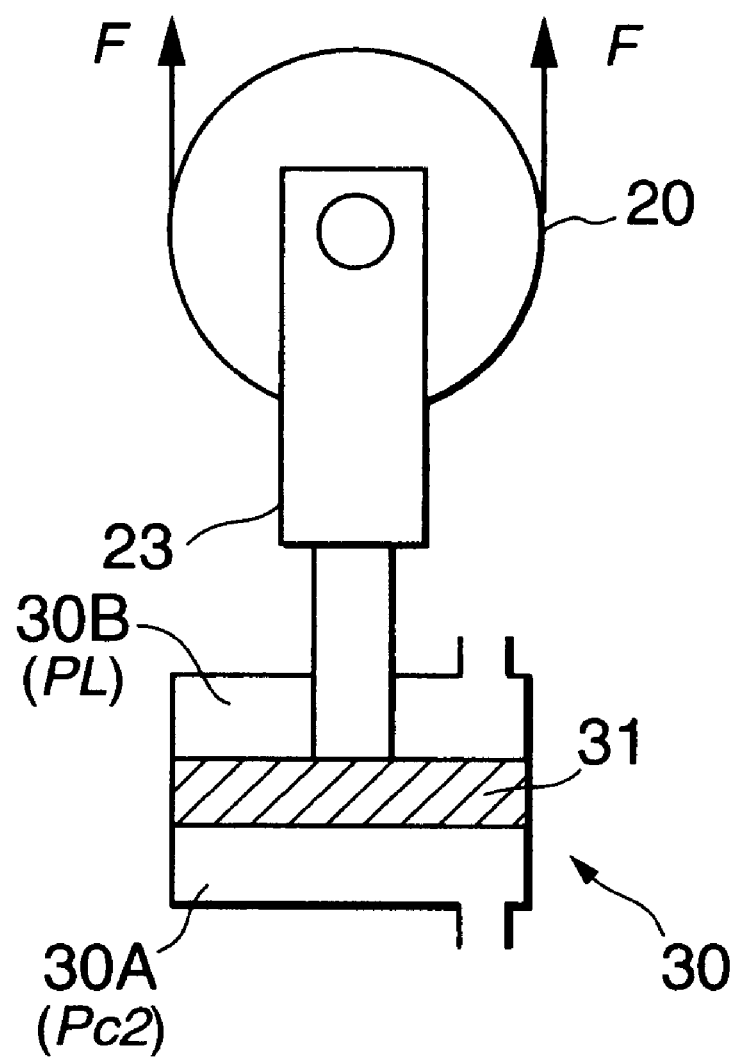
FIG. 20 is a schematic diagram of a trunnion describing a relation of a force F applied to the power roller of a toroidal continuously variable transmission and the differential pressure $\Delta P$.

In FIG. 20, the hydraulic cylinder 30 supports the power roller 20 via the trunnion 23 against the resultant force 2F which the input disk 21 and output disk 22 exert on the power roller 20. Here, if the differential pressure ΔP=PL−Pc2 of the oil chambers 30B and 30A of the cylinder 30 is set to a value equivalent to the resultant force 2F, the forces applied to the power roller 20 will balance.

When the differential pressure ΔP is increased from the balance of forces, the downward force acting on the power roller 20 increases. The input disk 21 then increases the upward force F and the output disk 22 also increases the upward force F due to the reaction so that the balance of forces acting on the power roller 20 is maintained. Thus, increase of forces while they are balanced causes an increase of the torque transmitted by the power roller 20. In other words, the torque transmitted by the power roller 20 can be changed by controlling the differential pressure ΔP.

Therefore, at the geared neutral position GNP for example, a creep torque can be generated as desired both in the forward and directions of the vehicle by controlling the differential pressure ΔP. However, the above relation holds only in the region in which the balance of forces is maintained. If the differential pressure ΔP varies largely, the power roller 20 will displace in the axial direction together with the trunnion 23, and the gyration angle φ will vary as a result. If the spool 46S is at the center position, inflow and outflow of oil to the oil chambers 30A, 30B is blocked, so it is impossible to control the differential pressure ΔP of these oil chambers.

Therefore, in the specific region where pressure control is performed, the speed ratio controller 80 controls the step motor 36 so that the spool 46S does not displace to the center position, by outputting a step number STEP which corresponds to a speed ratio outside the specific region.

Further, the change-over of the shift control valve 46, i.e., the change-over of the supply direction of oil pressure, is performed according to the direction of the torque supported by the hydraulic cylinder 30. In other words, the oil pressure supply direction is reversed depending on whether the speed ratio ic of the CVT 2 is increased or decreased.

When the vehicle starts and accelerates under the torque of the engine, conversely to the above-mentioned deceleration, the power roller 20 performs torque transmission in the negative direction, so a downward force opposite to the direction of the arrow in FIG. 20 acts on the power roller 20 on the right-hand side of FIG. 3. In this case, the step motor 36 displaces the spool 46S above the center position shown by the dashed line of FIG. 7 so that the line pressure PL is supplied to the oil chambers 30A and the control pressure Pc1 is supplied to the oil chambers 30B. Due to the decrease of the differential pressure ΔP of the oil chambers 30A and 30B, the trunnion 23 on the right-hand side of FIG. 3 displaces upward, and the power rollers 20 change the gyration angle φ in a direction which increases the speed ratio ic. In this case also, until the speed ratio ic reaches the boundary value D/mt of the specific region, the speed ratio can be finely controlled by pressure control which gradually reduces the pressure of the oil chambers 30B.

Further, when the vehicle is started up to move backwards from the stop state near the geared neutral position GNP, the power rollers 20 transmit a positive torque as in the case of deceleration when the vehicle is moving forward. In this case, the speed ratio controller 80 sets the target speed ratio of the CVT 2 to be less than the boundary value R/mt on the reverse side of the specific region, and a step number corresponding to the target speed ratio is input to the step motor 36. The step motor displaces the spool 46S in the downward direction of the figure via the speed change link 37, as shown by the solid line 37H in FIG. 7. As a result, the line pressure PL is supplied to the oil chambers 30B, the control pressure Pc2 is supplied to the oil chambers 30A, and the power roller 20 changes the gyration angle φ in the direction which decreases the speed ratio ic. In this case also, until the speed ratio ic reaches the boundary value R/mt of the specific region, pressure control which gradually reduces the control pressure Pc2 is performed.

When the vehicle decelerates in reverse, as in the case of acceleration when it is moving forward, the line pressure PL is supplied to the oil chambers 30A, and the control pressure Pc1 is supplied to the oil chambers 30B. In this case also, until the speed ratio ic reaches the boundary value R/mt, pressure control is performed to gradually increase the control pressure Pc1.

According to this non-finite speed ratio transmission device in which both flowrate control and pressure control are performed, it is also possible to mitigate speed change shocks.

In the direct mode, the target speed ratio may increase abruptly due to a speed change accompanied by a kickdown during travel.

When flowrate control is performed in the direct mode or the power circulation mode, the control pressure Pc1 is 0, but during such a sudden change of the target speed ratio, the positive torque control valve 40 temporarily increases the control pressure Pc1 and reduces the differential pressure ΔP of the oil chambers 30A and 30B. The decrease of the differential pressure ΔP is due to the fact that the torque transmitted by the power roller 20 is decreased, and the torque shock from the down shift due to the rapid increase of target speed ratio is diminished.

At the point RSP where there is a change-over between the direct mode and power circulation mode, the direct mode clutch 10 and the power circulation mode clutch 9 are operated.

For a smooth engaging operation of either of the clutches, it is desirable to maintain a speed ratio equivalent to RSP so as to eliminate a rotation speed difference between the rotating parts of the clutch. In this case, the CVT 2 can easily be held at the target speed ratio by flowrate control using the mechanical feedback members.

When the oil temperature is low, the response of pressure control valves, such as the positive torque control valve 40 and the negative torque control valve 45, falls off. The specific area where pressure control is performed in this non-finite speed ratio transmission device was limited to the region from D/mt to R/mt near the geared neutral position GNP, so if the vehicle starts to move forward or into reverse from the stop state, the speed ratio ic of the CVT 2 leaves the specific region immediately after startup, and thereafter, speed ratio control is performed by flowrate control. Therefore, the effect of low temperature oil on speed ratio control can be minimized.

In the above-mentioned embodiment, the forward/reverse direction in the specific region where pressure control is performed was set near the geared neutral position GNP, but the boundary value D/mt can be established at any arbitrary speed ratio between the revolution synchronization point RSP and geared neutral position GNP.

As long as the change-over from pressure control to flowrate control has been completed when the speed ratio ic reaches the revolution synchronization point RSP during acceleration, the value of D/mt will not affect speed ratio control in the subsequent direct mode.

Next, a second embodiment of this invention will be described referring to FIGS. 10–12B.

The differences between this embodiment and the aforesaid first embodiment are as follows.

The normally closed positive torque control valve 40X and negative torque control valve 45X are used instead of the positive torque control valve 40 and negative torque control valve 45, and the shift control valve 46 is replaced by a shift control valve 146 having a different construction.

Whereas the valves 40 and 45 of the aforesaid first embodiment controlled the pressure on the low pressure side of the oil chambers 30A, 30B via the shift control valve 46, the valves 40X and 45X control the pressure on the high pressure side of the oil chambers 30A and 30B.

For this purpose, the shift control valve 146 is equipped with two pressure ports 146PI, 146PD, the valve 40X is connected to the pressure port 146PI, and the valve 45X is connected to the pressure port 146PD, respectively. On the other hand, two drain ports 146D corresponding to the drain ports 46I, 46J of the aforesaid first embodiment are directly released to the drain.

Figure 11:
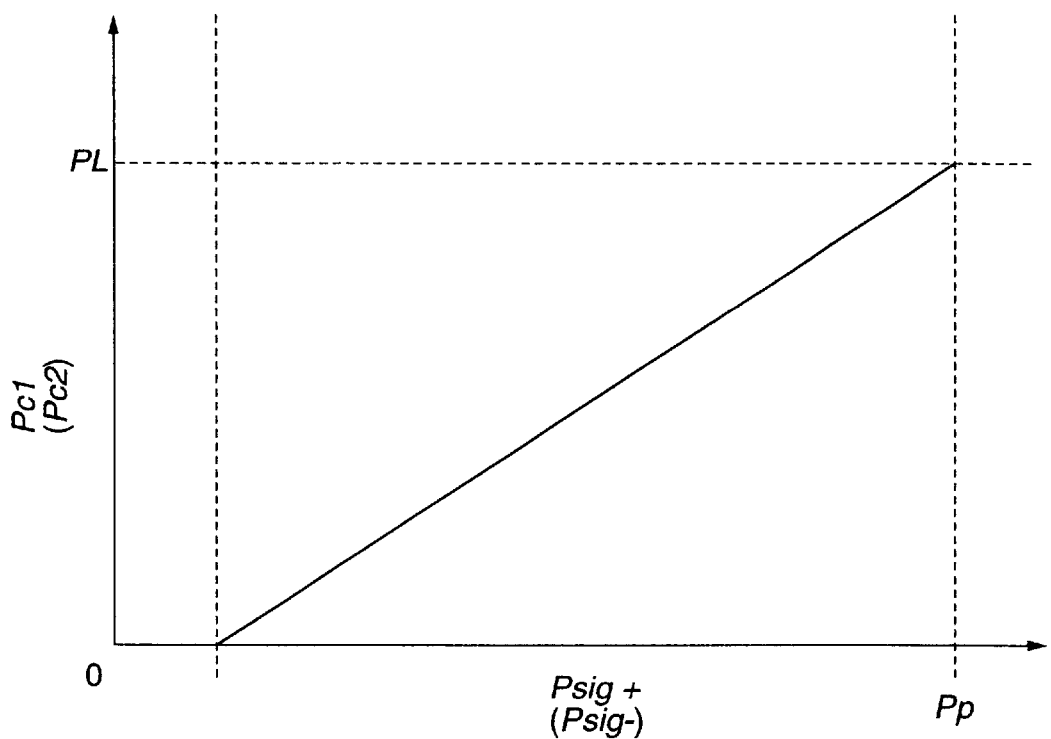
FIG. 11 is a diagram describing a relation of the signal pressure Psig+ and the control pressure Pc1 in a torque control valve according to the second embodiment of this invention.

As shown in FIG. 11, when the signal pressure Psig+ of the positive torque solenoid valve 50 increases, the positive torque control valve 40X makes the pressure Pc1 of the output port 40D increase, for example within a range from 0 to the line pressure PL.

Likewise, when the signal pressure Psig– of the negative torque solenoid valve 55 increases, the negative control valve 45X makes the control pressure Pc2 of the output port 45D increase, for example within a range of 0 to the line pressure PL.

When the step motor 36 drives the spool 146S in the speed ratio increase direction, the shift control valve 146 supplies the control pressure Pc2 to the oil chambers 30A, and releases the oil chambers 30B to the drain. Conversely, when the step motor 36 drives spool 146S in the speed ratio decrease direction, the oil chambers 30A is released to the drain, and the control pressure Pc1 is supplied to the oil chambers 30B.

In this embodiment also, in addition to flowrate control by the mechanical feedback members, pressure control due to the variation of the control pressures Pc1 and Pc2 is performed in the specific region between D/mt and R/mt.

Figure 12A:
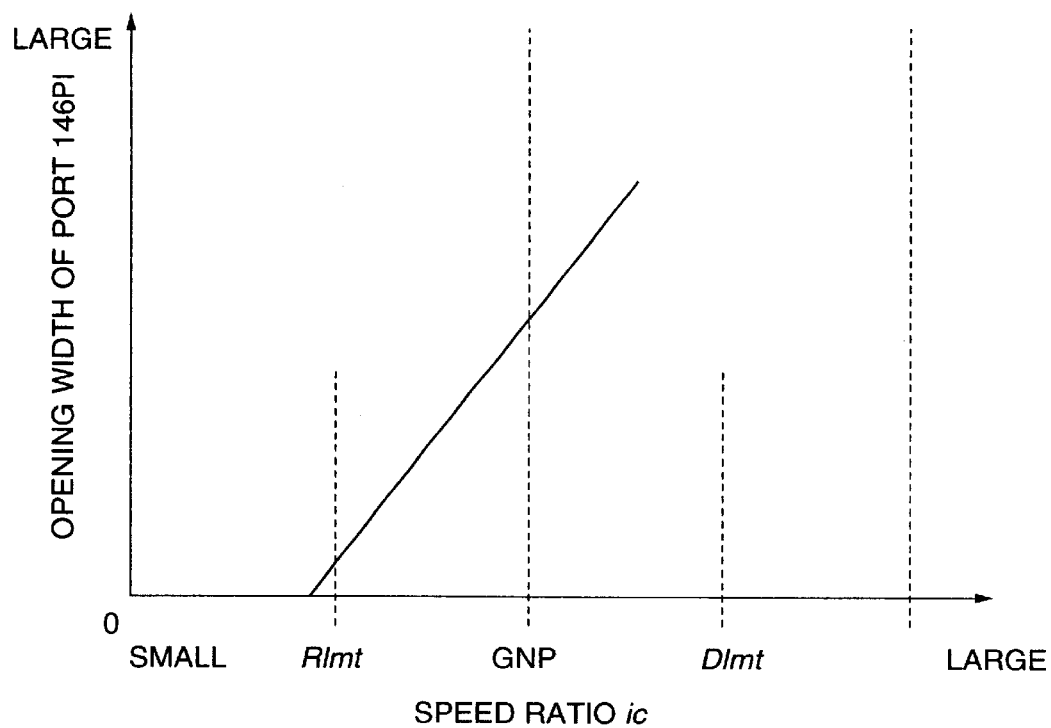
FIGS. 12A and 12B are diagrams describing a relation of the speed ratio ic of the toroidal continuously variable transmission near the geared neutral position GNP and the opening width of a supply port according to the second embodiment of this invention.

When the speed ratio ic of the CVT 2 is smaller than the geared neutral position GNP, an opening of the pressure port 146PI varies as shown in FIG. 12A.

Figure 12B:
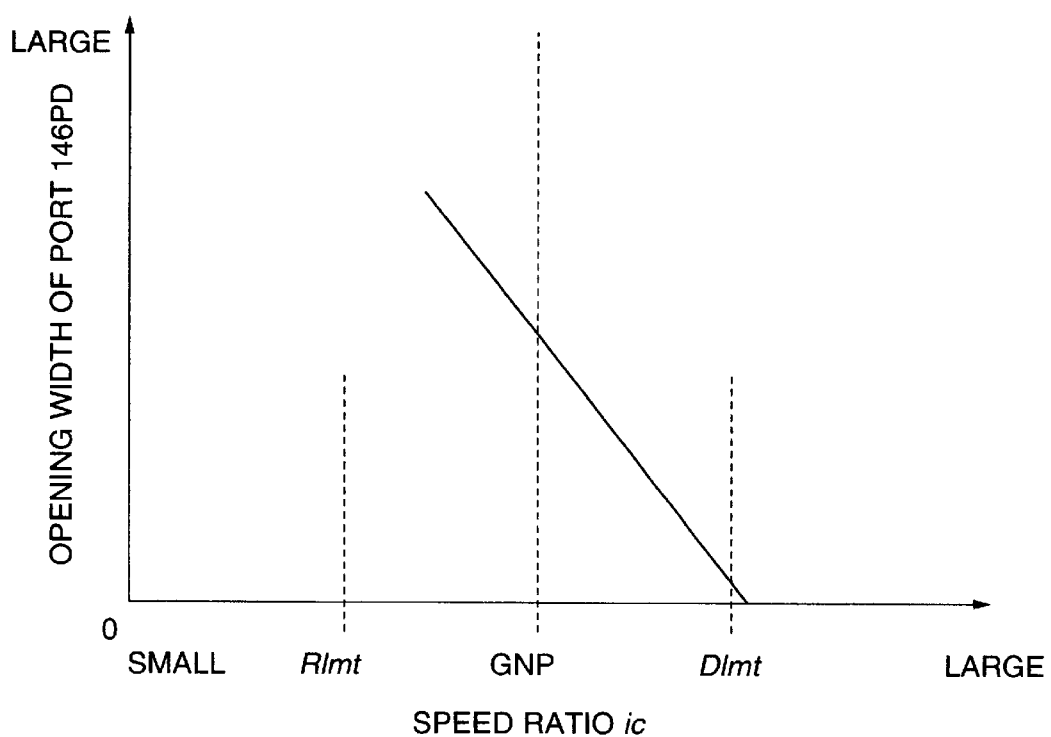

When the speed ratio ic of the CVT 2 is larger than the geared neutral position GNP, an opening of the pressure port 146PD varies as shown in FIG. 12B.

In this embodiment, the same desirable effects are obtained as in the aforesaid first embodiment.

A third embodiment of this invention will now be described referring to FIGS. 13 and 14.

Figure 13:
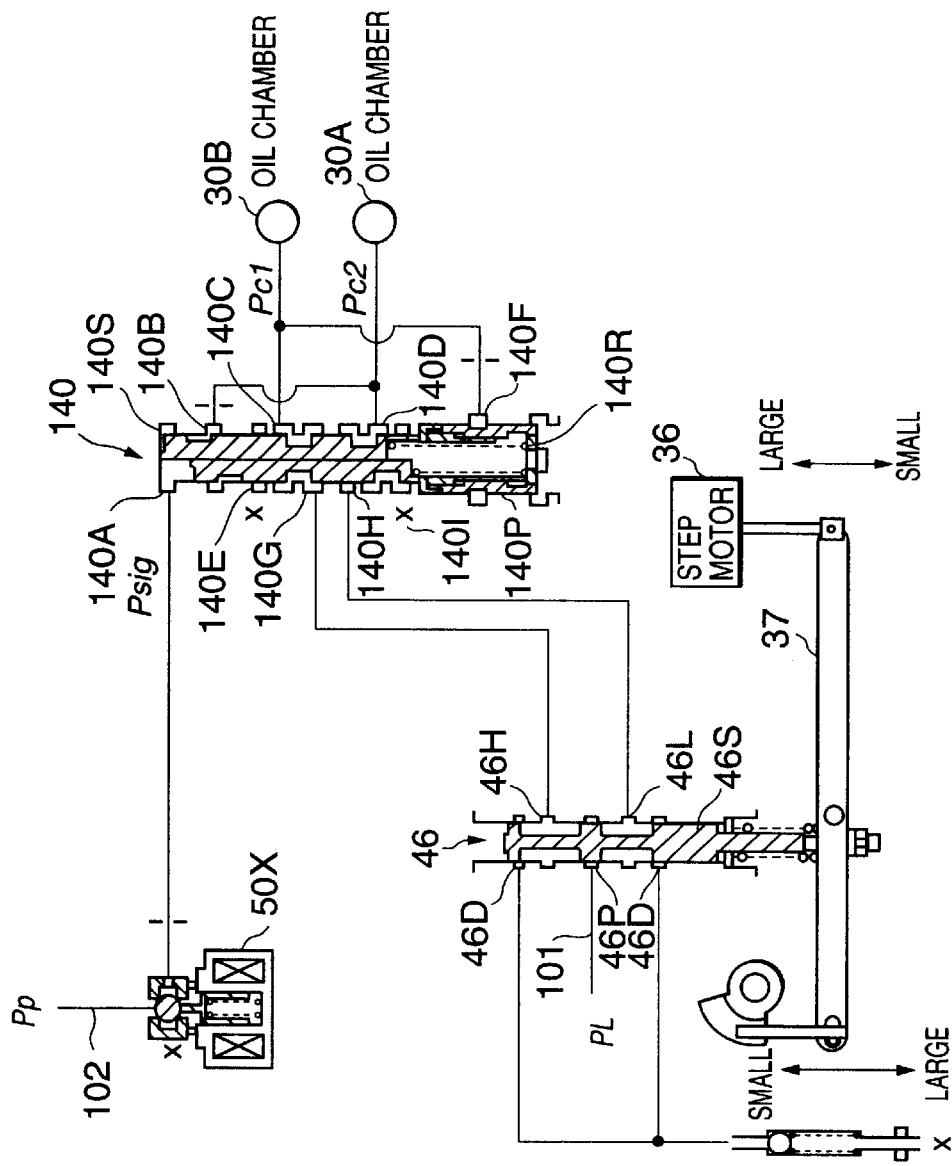
FIG. 13 is a diagram of the hydraulic pressure circuit of a non-finite speed ratio transmission device according to a third embodiment of this invention.
Figure 14:
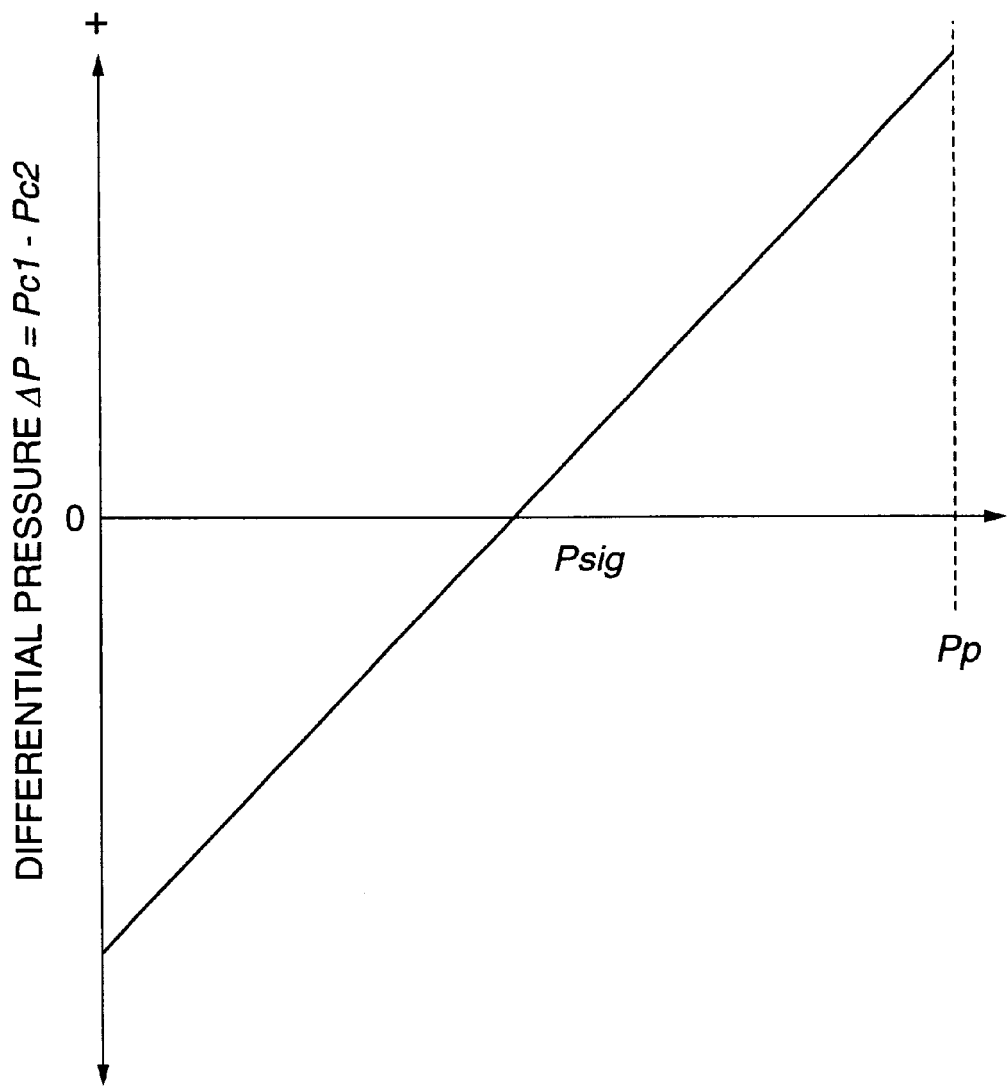
FIG. 14 is a diagram showing a relation of the signal pressure Psig and the differential pressure $\Delta P$ in a torque control valve according to the third embodiment of this invention.

In this embodiment, instead of performing pressure control using the positive torque control valve 40 and the negative torque control valve 45 as in the aforesaid first embodiment, pressure control is performed using the pressure control valve 140 which is interposed between the shift control valve 46 and the hydraulic cylinders 30 as shown in FIG. 13.

In the shift control valve 46, instead of the drain ports 46I, 46J of the aforesaid first embodiment, two drain ports 46D are provided which are directly released to the drain. Also, the second port 46L is connected to the port 140H of the differential pressure control valve 140, and the first port 46H is connected to the port 140G of the pressure control valve 140.

The differential pressure control valve 140 varies the differential pressure ΔP of the cylinders 30 according to the signal pressure Psig from the torque solenoid valve 50X. The torque solenoid valve 50X comprises a valve which is normally closed which gives a signal pressure Psig of 0 when it is not excited and a signal pressure Psig=Pp when it is fully excited, as in the case of the positive torque solenoid valve 50 of the aforesaid first embodiment.

Referring to FIG. 13, the differential pressure control valve 140 comprises a spool 140S, and in addition to the above-mentioned ports 140H and 140G, it also comprises an output port 140D and feedback port 140B connected to the port 140A which leads the signal pressure Psig of the torque solenoid 50X, output port 140D and feedback port 140B connected to the oil chambers 30A, output port 140C and feedback port 140F connected to the oil chambers 30B, and drain ports 140E, 140I.

The lower end of the spool 140S is elastically supported by a spring 140R.

The spool 140S is held in a position where a downward force in FIG. 13 which is the sum of the signal pressure Psig of the port 140A and the oil pressure of the oil chambers 30A led to the feedback port 140B, and an upward force which is the sum of the pressure of the oil chambers 30B which is led from the feedback port 140F via the sleeve 140P and the resilient force of the spring 140R, are balanced.

Depending on its displacement position, the spool 140S selectively connects the output port 140D to the port 140H or the drain port 140I. At the same time, it selectively connects the output port 140C to the port 140G or the drain port 140E.

Here, when the oil pressure of the oil chambers 30A is Pc2 and the oil pressure of the oil chambers 30B is Pc1, the differential pressure ΔP=Pc1−Pc2. Due to the above construction, the differential pressure control valve 140 varies the differential pressure ΔP according to the signal pressure Psig as shown in FIG. 14.

Specifically, when the signal pressure Psig is set to a predetermined value, the differential pressure ΔP of the oil chambers 30A and 30B is 0. If the signal pressure Psig decreases from this predetermined value, the spool 140S undergoes a displacement to the upper part of FIG. 13, the communicating portion of the port 140H and output port 140D increases, and the oil pressure Pc2 of the oil chambers 30A increases. Simultaneously, the communicating portion of the drain port 140E and output port 140C increases, and the oil pressure Pc1 of the oil chambers 30B falls. Therefore, the differential pressure ΔP is increased in the negative direction.

On the other hand, when the signal pressure Psig increases from the predetermined value, the spool 140S undergoes a displacement to the lower part of FIG. 13, the communicating portion of the port 140G and output port 140C increases, and the oil pressure Pc1 of the oil chambers 30B increases. Simultaneously, the communicating portion of the drain port 140I and output port 140D increases, and the oil pressure Pc2 of the oil chambers 30A falls. Therefore, the differential pressure ΔP increases in the positive direction.

When flowrate control of the speed ratio ic is performed, the speed ratio controller 80 changes over the shift control valve 46 according to the direction in which the speed ratio ic should vary, the line pressure PL is supplied to either of the ports 140G, 140H, and depending on the port to which the line pressure PL is supplied, the signal pressure Psig of the solenoid valve 50X is set to the minimum value of 0 or the maximum pilot pressure Pp.

For example, when the speed ratio ic is to be increased, the speed ratio controller 80 drives the step motor 36 in the speed ratio increase direction, and the excitation current of the solenoid valve 50X is controlled so that the solenoid valve 50X outputs a signal pressure Psig equal to 0. Hence, the line pressure PL is supplied to the port 140H, and in the differential pressure control valve 140, the spool 140S displaces to the upper part of FIG. 13 due to the signal pressure Psig equal to 0, the line pressure PL of the port 140H is supplied to the oil chambers 30A via the port 140D, and the oil chambers 30B are connected to the drain port 140E via the port 140C. As a result, the trunnion 23 on the right-hand side of FIG. 3 is driven upwards, the trunnion 23 on the left-hand side of is driven downwards, and the power rollers 20 vary the gyration angle φ in the direction which increases the speed ratio ic.

On the other hand, when the speed ratio ic of the CVT 2 is to be decreased, the speed ratio controller 80 drives the step motor 36 in the speed ratio decrease direction, and the excitation current of the solenoid valve 50X is controlled so that the solenoid valve 50X outputs a signal pressure Psig equal to the pilot pressure Pp. Hence, the line pressure PL is supplied to the port 140G, and in the differential pressure control valve 140, the spool 140S undergoes a displacement to the lower part of FIG. 13 due to the signal pressure Psig equal to the pilot pressure Pp, the line pressure PL of the port 140G is supplied to the oil chambers 30B via the port 140C, and the oil chambers 30A are connected to the drain port 140I via the port 140D. As a result, the trunnion 23 on the right-hand side of FIG. 3 is driven downwards, the trunnion 23 on the left-hand side is driven upwards, and the power rollers 20 vary the gyration angle φ in the direction in which the speed ratio ic decreases.

When pressure control is performed, after controlling the speed ratio ic to the specific region by flowrate control, the speed ratio controller 80 adjusts the differential pressure ΔP=Pc1 −Pc2 by varying the signal pressure Psig of the solenoid valve 50X, and the transmission torque is controlled.

A fourth embodiment of this invention will now be described referring to FIGS. 15 and 16.

In this embodiment, instead of the positive torque control valve 40 and the negative torque control valve 45 of the aforesaid first embodiment, pressure control of the cylinder 30 is performed using a single pressure control valve 240.

Figure 15:
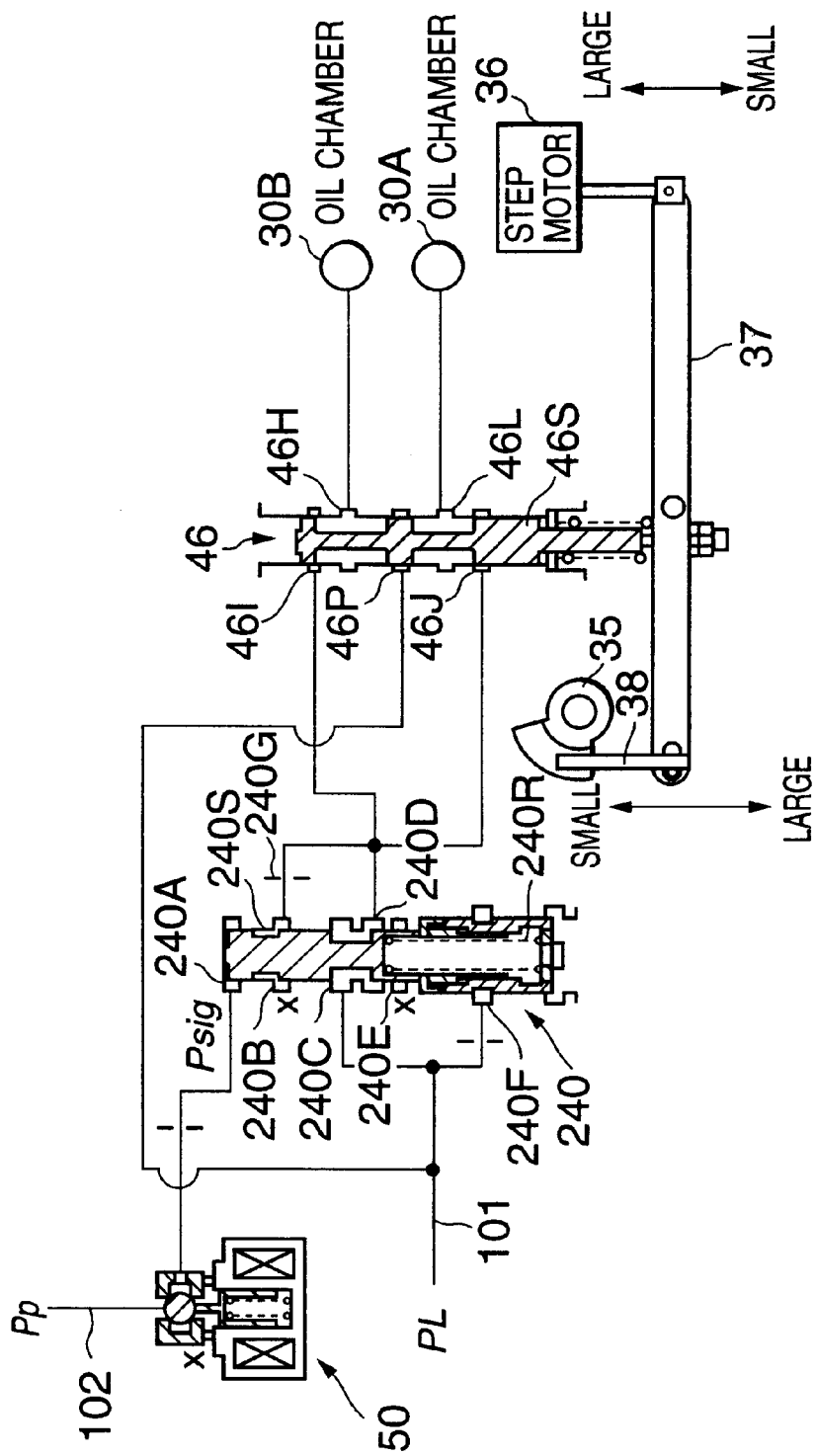
FIG. 15 is a diagram of the hydraulic pressure circuit of a non-finite speed ratio transmission device according to a fourth embodiment of this invention.
Figure 16:
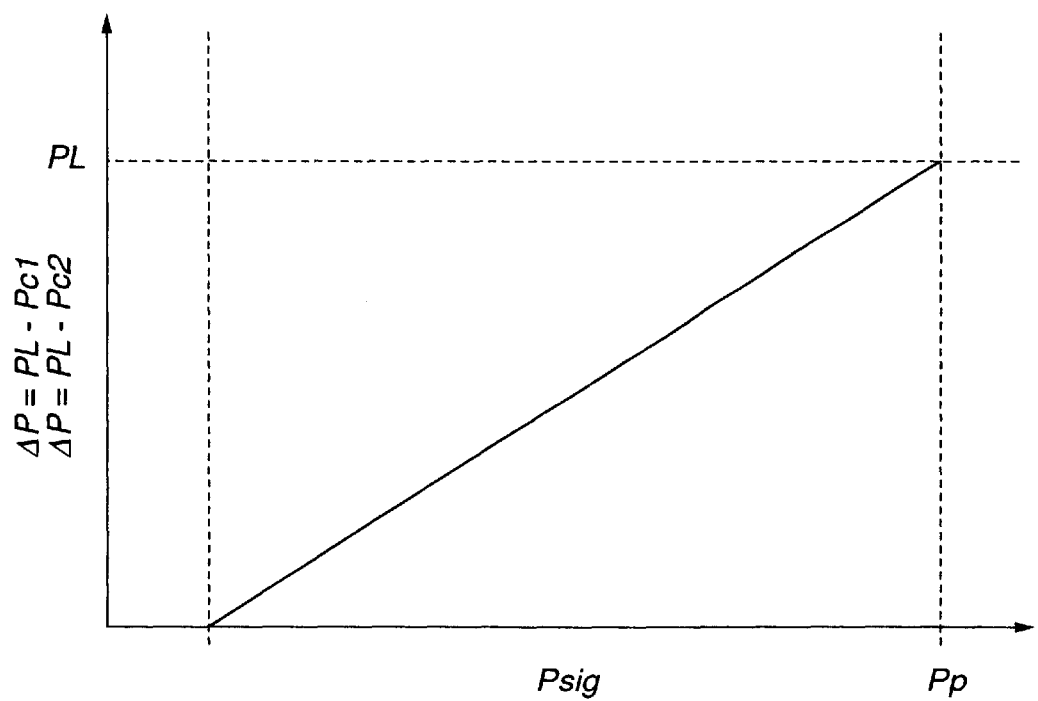
FIG. 16 is a diagram showing a relation of the signal pressure Psig and differential pressure $\Delta P$ in a torque control valve according to the fourth embodiment of this invention.

As shown in FIG. 15, a signal pressure port 240A which leads the signal pressure Psig from the solenoid valve 50X, pressure port 240C which inputs the line pressure PL, output port 240D, feedback port 240F which feeds back the line pressure PL, and two drain ports 240B, 240E are provided facing the spool 240S. The lower end of the spool 240S is elastically supported by a spring 240R. The spool 240S is maintained in a position at which the force exerted by the signal pressure Psig of the port 240A in the downward direction of the figure, the force exerted by the line pressure PL of the feedback port 240F in the upward direction and the force exerted by the spring 240R in the upward direction, are balanced. The output port 240D is connected to the ports 46I, 46J of the shift control valve 46, and is connected to the drain port 240B via an orifice 240G.

Due to the above construction, a pressure less than the line pressure PL depending on the signal pressure Psig is simultaneously applied to the ports 46I, 46J. Therefore, the differential pressure ΔP=PL−Pc2 of the oil chambers 30B and 30A when the spool 46S of the shift control valve 46 displaces downwards in FIG. 15, and the differential pressure ΔP=PL−Pc1 of the pressure port 46P and port 46I when the spool 46S of the shift control valve 46 displaces upwards in FIG. 15, vary according to the signal pressure Psig as shown in FIG. 16. As shown in this figure, when the signal pressure Psig is 0, the differential pressure ΔP is also 0, and when the signal pressure Psig is equal to the pilot pressure Pp, the differential pressure ΔP becomes equal to the line pressure PL. Further, when performing the flowrate control of the speed ratio ic of CVT 2, the speed ratio controller 80 adjusts the differential pressure ΔP by increasing or decreasing the signal pressure Psig of the solenoid valve 50X, and the transmitted torque is thereby controlled.

Figure 17:
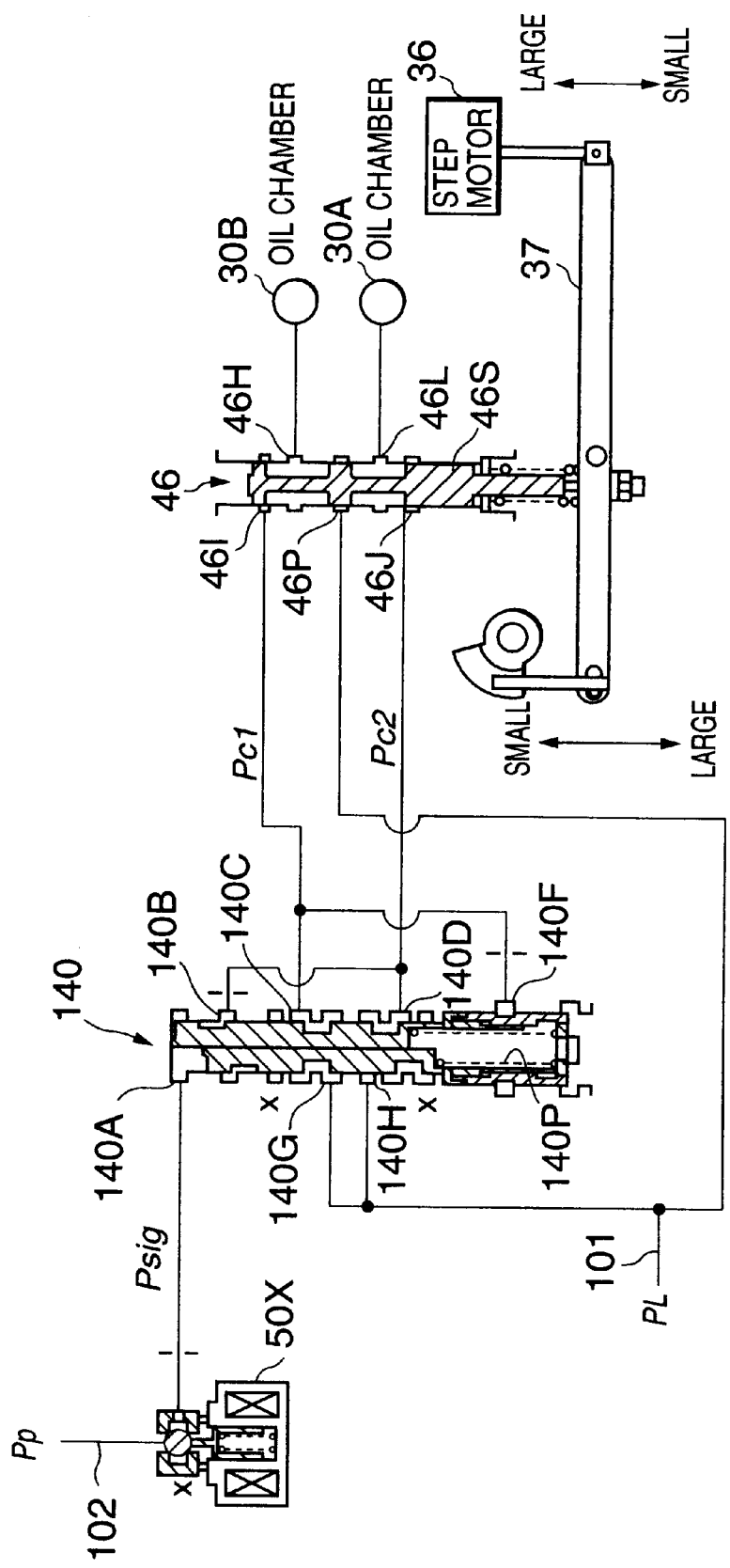
FIG. 17 is a diagram of the hydraulic pressure circuit of a non-finite speed ratio transmission device according to a fifth embodiment of this invention.

A fifth embodiment of this invention will now be described referring to FIG. 17.

In this embodiment, the ports 46I, 46J of the shift control valve 46 are made to produce the same differential pressure ΔP as that of FIG. 13 according to the signal pressure Psig of the solenoid valve 50X by replacing the pressure control valve 240 of the aforesaid fourth embodiment by the differential pressure control valve 140 of the third embodiment. According to this embodiment, the speed ratio controller 80 changes over the displacement positions of the spool 46S according to the direction in which the speed ratio ic should be varied. When the step motor 36 drives the speed change link 37 in the speed ratio increase direction shown in FIG. 17, the line pressure PL is supplied to the oil chambers 30A via the pressure port 46P, and the pressure Pc1 is supplied to the oil chambers 30B via the port 46I.

When the solenoid valve 50X outputs a signal pressure Psig equal to the pilot pressure Pp, the pressure Pc2 is 0, and flowrate control of the speed ratio ic of the CVT 2 is therefore performed.

When the step motor 36 drives the speed change link 37 in the speed ratio decrease direction, the line pressure PL is supplied to the oil chambers 30B via the pressure port 46P, and the pressure Pc2 is supplied to the oil chambers 30A via the port 46J.

When the solenoid valve 50X outputs a signal pressure Psig equal to 0, the pressure Pc2 is 0, and flowrate control of the speed ratio ic of the CVT 2 is therefore performed.

When performing pressure control, after the speed ratio ic reaches D/mt or R/mt from the non-specific region in the power circulation mode, the speed ratio controller 80 adjusts the differential pressure ΔP by increasing or decreasing the signal pressure Psig of the solenoid valve 50X, and the transmitted torque is thereby controlled.

Therefore, according to this embodiment, the same control as in the aforesaid third embodiment is possible.

Figure 18:
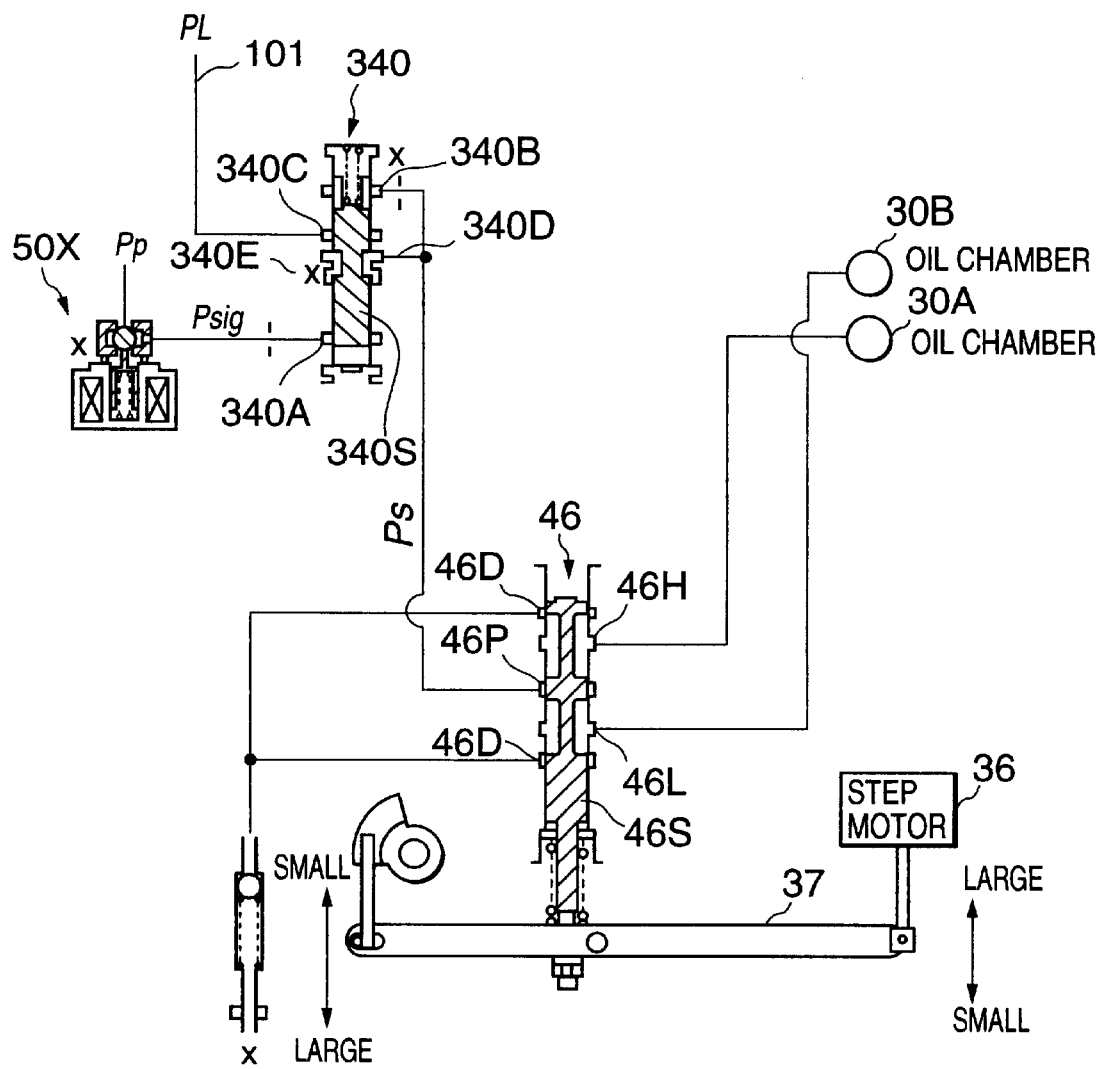
FIG. 18 is a diagram of the hydraulic pressure circuit of a non-finite speed ratio transmission device according to a sixth embodiment of this invention.

Next, a sixth embodiment of this invention will be described referring to FIGS. 18 and 19.

According to this embodiment, instead of the two torque control valves 40 and 45 of the aforesaid second embodiment, the pressure of the pressure port 46P of the shift control valve 46 is controlled using one torque control valve 340.

The construction of the shift control valve 46 is identical to that of the aforesaid third embodiment.

A signal pressure port 340A which leads the signal pressure Psig of the solenoid valve 50X, pressure port 340C which inputs the line pressure PL, output port 340D and feedback port 340B which feeds back the output pressure, are formed facing the spool 40S in the torque control valve 340. The spool 340S is held in a position in which a downward force in FIG. 18 due to the spring 340R and feedback pressure of the feedback port 340B, and the upward force due to the signal pressure Psig of the signal pressure port 340A, are balanced.

The first port 46H of the shift control valve 46 is connected to the oil chambers 30B, and the second port 46L is connected to the oil chambers 30A, respectively. The pressure port 46P is connected to the output port 340D of the torque control valve 340.

Figure 19:
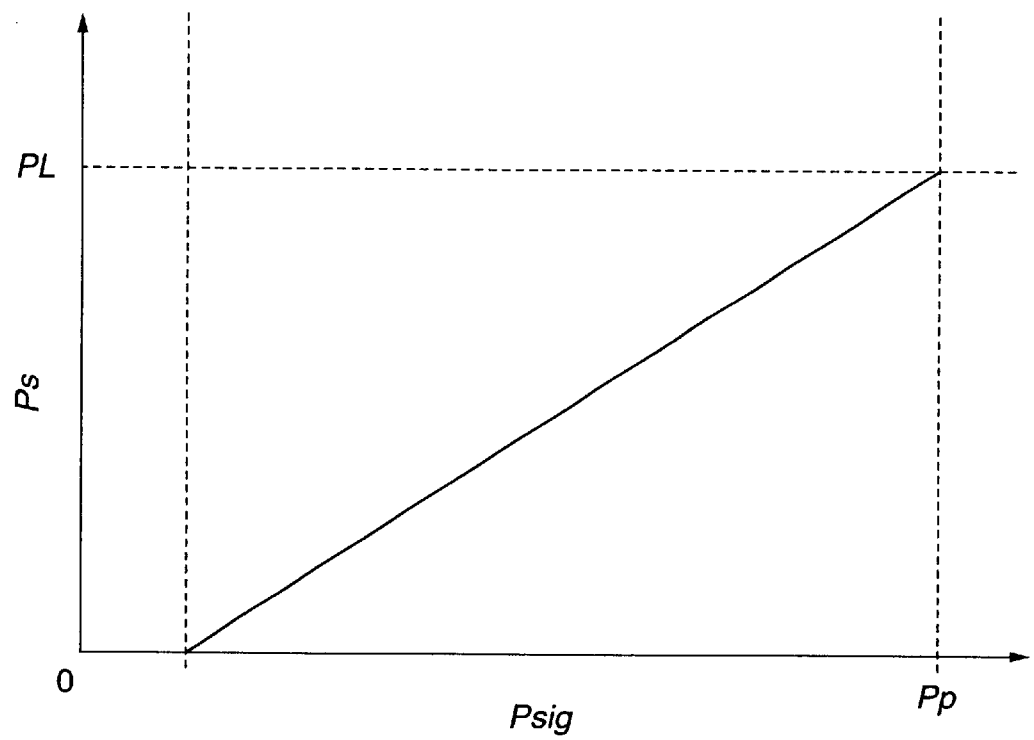
FIG. 19 is a diagram which shows a relation of the signal pressure Psig and differential pressure $\Delta P$ in a torque control valve according to the sixth embodiment of this invention.

Due to the above construction, the pressure Ps of the pressure port 46P varies between 0 and the line pressure PL according to the signal pressure Psig as shown in FIG. 19, and if the signal pressure Psig is set equal to the pilot pressure Pp, the line pressure PL is supplied to the pressure port 46P.

Hence, when flowrate control of the speed ratio ic of the CVT 2 is performed, if the speed ratio controller 80 drives the spool 46S by the step motor 36 in this state, the line pressure PL is supplied to the oil chambers 30A (30B) according to the drive direction, and the other oil chambers 30B (30A) are connected to the drain.

When pressure control is performed, the differential pressure ΔP of oil chambers 30A and 30B can be arbitrarily set by causing the signal pressure Psig to increase or decrease via the solenoid valve 50X. Further, the transmitted torque can be changed over between positive and negative according to the displacement direction from the center position of the spool 46S which the speed ratio controller 80 drives via the step motor 36.

The contents of Tokugan Hei 10-356278, with a filing date of Dec. 15, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the above embodiments, the speed change link 37 is used as a mechanical feedback member, but it is also possible to use a sleeve which displaces relative to the spool 46S in response to the step motor 36 and precess cam 35, as disclosed by Tokkai Sho 63-130954 published by the Japanese Patent Office in 1988.

The embodiments of this invention in which an exclusive property or privilege is claimed are defined as follows:

What is claimed is:

1. A non-finite speed ratio transmission device for use with a vehicle, comprising:
   - a toroidal continuously variable transmission which varies a speed ratio according to a gyration angle of a power roller gripped by an input disk and output disk, the power roller varying the gyration angle according to a displacement of a supporting member which supports the power roller;
   - a fixed speed ratio transmission which varies a rotation speed of the input disk at a fixed speed ratio;
   - a planetary gear unit having a final output shaft which varies a rotation direction according to a relation between a rotation output speed of the toroidal continuously variable transmission and a rotation output speed of the fixed speed ratio transmission;
   - a hydraulic cylinder comprising a first oil chamber and second oil chamber, which displaces the supporting member according to a differential pressure between the first oil chamber and the second oil chamber;
   - a direction change-over valve which comprises a valve body, a pressure port selectively connected to one of the first oil chamber and second oil chamber, according to whether the speed ratio of the toroidal continuously variable transmission should be increased or decreased, based on the displacement of the valve body, a first drain port connected to the first oil chamber when the pressure port is connected to the second oil chamber, and a second drain port connected to the second oil chamber when the pressure port is connected to the first oil chamber;
   - an actuator which displaces the valve body;
   - a feedback member which connects the supporting member and direction change-over valve, and feeds back a displacement of the power roller to the direction change-over valve, the valve body being displaced by the feedback member in a direction opposite to a direction of displacement of the valve body due to the actuator;
   - a first oil pressure control valve which is connected to the first drain port of the direction change-over valve and varies a pressure of the first drain port between zero and the pressure of the pressure port; and
   - a second oil pressure control valve which is connected to the second drain port of the direction change-over valve and varies a pressure of the second drain port between zero and the pressure of the pressure port.

2. A non-finite speed ratio transmission device for use with a vehicle, comprising:
   - a toroidal continuously variable transmission which varies a speed ratio according to a gyration angle of a power roller gripped by an input disk and output disk, the power roller varying the gyration angle according to a displacement of a supporting member which supports the power roller;
   - a fixed speed ratio transmission which varies a rotation speed of the input disk at a fixed speed ratio;
   - a planetary gear unit having a final output shaft which varies a rotation direction according to a relation between a rotation output speed of the toroidal continuously variable transmission and a rotation output speed of the fixed speed ratio transmission;
   - a hydraulic cylinder comprising a first oil chamber and second oil chamber, which displaces the supporting member according to a differential pressure between the first oil chamber and the second oil chamber;
   - a direction change-over valve which comprises a valve body, a pressure port selectively connected to one of the first oil chamber and the second oil chamber, according to whether the speed ratio of the toroidal continuously variable transmission should be increased or decreased, based on the displacement of the valve body, and a drain port connected to the other of the first oil chamber and the second oil chamber;
   - an actuator which displaces the valve body;
   - a feedback member which connects the supporting member and direction change-over valve, and feeds back a displacement of the power roller to the direction change-over valve, the valve body being displaced by the feedback member in a direction opposite to a direction of displacement of the valve body due to the actuator; and an oil pressure control valve, connected to the drain port of the direction change-over valve, generating a control pressure to apply to the drain port, comprising a control valve body, a line pressure feedback port that applies a pressure of the pressure port of the direction change-over valve to the control valve body in one direction, and a control pressure feedback port that applies the control pressure to the control valve body in another direction opposite to the one direction, so that the oil pressure control valve directly controls the differential pressure between the pressure of the pressure port and the control pressure.

3. A non-finite speed ratio transmission device for use with a vehicle, comprising:

a toroidal continuously variable transmission which varies a speed ratio according to a gyration angle of a power roller gripped by an input disk and an output disk, the power roller varying the gyration angle according to a displacement of a supporting member which supports the power roller;

a fixed speed ratio transmission which varies a rotation speed of the input disk at a fixed speed ratio;

a planetary gear unit having a final output shaft which varies a rotation direction according to a relation between a rotation output speed of the toroidal continuously variable transmission and a rotation output speed of the fixed speed ratio transmission;

a hydraulic cylinder comprising a first oil chamber and a second oil chamber, which displaces the supporting member according to a differential pressure between the first oil chamber and the second oil chamber;

a direction change-over valve which comprises a valve body, a pressure port selectively connected to one of the first oil chamber and the second oil chamber, according to whether the speed ratio of the toroidal continuously variable transmission should be increased or decreased, based on the displacement of the valve body, a first drain port connected to the first oil chamber when the pressure port is connected to the second oil chamber; and a second drain port connected to the second oil chamber when the pressure port is connected to the first oil chamber;

an actuator which displaces the valve body;

a feedback member which connects the supporting member and the direction change-over valve, and feeds back a displacement of the power roller to the direction change-over valve, the valve body being displaced by the feedback member in a direction opposite to a direction of displacement of the valve body due to the actuator;

a first oil pressure control valve, connected to the first drain port of the direction change-over valve, generating a first control pressure to apply to the first drain port between zero and tile pressure of the pressure port, comprising a first control valve body, a first line pressure feedback port that applies a pressure of the pressure port of the direction change-over valve to the first control valve body in a first direction, and a first control pressure feedback port that applies the first control pressure to the first control valve body in another direction opposite to the first direction, so that the first oil pressure control valve directly controls the differential pressure between the pressure of the pressure port and the first control pressure; and a second oil pressure control valve, connected to the second drain port of the direction change-over valve, generating a second control pressure to apply to the second drain port between zero and the pressure of the pressure port, comprising a second control valve body, a second line pressure feedback port that applies a pressure of the pressure port of the direction change-over valve to the second control valve body in a second direction, and a second control pressure feedback port that applies the second control pressure to the second control valve body in another direction opposite to the second direction, so that the second oil pressure control valve directly controls the differential pressure between the pressure of the pressure port and the second control pressure.

* * * * *